United States Patent
Kodama et al.

(10) Patent No.: US 8,335,934 B2
(45) Date of Patent: Dec. 18, 2012

(54) ASSESSING CONDITIONS OF POWER CONSUMPTION IN COMPUTER NETWORK

(75) Inventors: Yasuhiro Kodama, Yokohama (JP);
Mitsuru Nagasaka, Kokubunji (JP);
Shinichi Akahane, Hachioji (JP);
Tomohiko Kouno, Yokohama (JP);
Teruo Kaganoi, Funabashi (JP); Takeki Yazaki, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 319 days.

(21) Appl. No.: 12/636,182

(22) Filed: Dec. 11, 2009

(65) Prior Publication Data

US 2010/0229016 A1    Sep. 9, 2010

(30) Foreign Application Priority Data

Mar. 4, 2009 (JP) ................... 2009-050710

(51) Int. Cl.
*G06F 1/32* (2006.01)

(52) U.S. Cl. ........ 713/300; 713/310; 713/320; 713/321; 713/322; 713/323; 713/324; 713/330; 713/340

(58) Field of Classification Search ................... 713/300, 713/310, 320–324, 330, 340
See application file for complete search history.

(56) References Cited

U.S. PATENT DOCUMENTS

| | | | | |
|---|---|---|---|---|
| 7,634,671 | B2 * | 12/2009 | Frietsch et al. | 713/300 |
| 7,668,105 | B1 * | 2/2010 | Zimmerman | 370/241 |
| 2007/0094527 | A1 * | 4/2007 | Frietsch et al. | 713/340 |

FOREIGN PATENT DOCUMENTS

JP    2002-142385    5/2002

* cited by examiner

*Primary Examiner* — M Elamin
(74) *Attorney, Agent, or Firm* — Antonelli, Terry, Stout & Kraus, LLP.

(57) ABSTRACT

A network system forms a computer network, and includes: a collecting unit; a calculating unit; and a display unit. The collecting unit collects power consumption information from a connecting device. The power consumption information shows power consumption of the connecting device. The calculating unit calculates power consumption of the computer network based on the collected power consumption information. The calculated power consumption is itemized into constituent units based on a configuration of the computer network. The display unit displays the calculated power consumption.

21 Claims, 19 Drawing Sheets

ASSESSING CONDITIONS OF POWER CONSUMPTION IN COMPUTER NETWORK

CROSS-REFERENCE TO RELATED APPLICATIONS

The present application claims the priority based on Japanese Patent Application No. 2009-50710 filed on Mar. 4, 2009, the disclosure of which is hereby incorporated by reference in its entirety.

BACKGROUND

The present invention relates to a network system for forming a computer network.

In recent years, as for a network device making up a computer network (for example, a connecting device such as a switch and a router), power consumption of the network device is on the increase along with increasing amounts of data flowing over the computer network. To respond to such increased power consumption, there exist needs to take measures based on assessing conditions of power consumption in the computer network.

JP-A-2002-142385 discloses technology for monitoring power consumption in a computer network. The technology teaches storing, beforehand, information showing amounts of power consumption in each individual network device on a network, and monitoring power consumption of the entire network based on the information stored in the network devices.

SUMMARY

However, sufficient examination was not made regarding assessing conditions of power consumption in a computer network with considering how to respond to increased power consumption. For example, there are needs to assess power consumption conditions in a computer network so as to be able to obtain information which would be useful in devising actions to limit power consumption, like actions such as upgrading some of the elements which make up a network device, and requesting a certain user to limit network traffic.

In view of this problem, an advantage of some aspects of the invention is to provide technology that enables to assess conditions of power consumption in a computer network.

An advantage of some aspects of the invention is intended to address this issue at least in part, and can be reduced to practice as described below.

A network system according to an aspect of the invention forms a computer network, and includes: a collecting unit; a calculating unit; and a display unit. The collecting unit collects power consumption information from a connecting device. The power consumption information shows power consumption of the connecting device. The connecting device interconnects a plurality of communication paths in the computer network. The calculating unit calculates power consumption of the computer network based on the collected power consumption information. The calculated power consumption is itemized into constituent units based on a configuration of the computer network. The display unit displays the calculated power consumption. According to the network system in this aspect, the power consumption of the computer network can be displayed by being itemized into the constituent units based on the configuration of the computer network. As a result, conditions of the power consumption of the computer network can be assessed.

A connecting apparatus according to an aspect of the invention interconnects a plurality of communication paths in a computer network, and includes: a power information generating unit; and a notification unit. The power information generating unit generates power consumption information. The generated power consumption information shows power consumption of the connecting apparatus and is itemized into constituent units based on a configuration of the connecting apparatus. The notification unit notifies a managing device of the generated power consumption information. The managing device manages the computer network. According to the connecting apparatus in this aspect, the power consumption information of the connecting apparatus itemized into the constituent units based on the configuration of the connecting apparatus can be integrated in the managing device. As a result, conditions of the power consumption of the connecting apparatus can be assessed by the managing device.

A managing apparatus according to an aspect of the invention manages a computer network, and includes: a collecting unit; a calculating unit; and a display unit. The collecting unit collects power consumption information from a connecting device. The power consumption information shows power consumption of the connecting device. The connecting device interconnects a plurality of communication paths in the computer network. The calculating unit calculates power consumption of the computer network based on the collected power consumption information. The calculated power consumption is itemized into constituent units based on a configuration of the computer network. The display unit displays the calculated power consumption. According to the managing apparatus in this aspect, the power consumption of the computer network can be displayed by being itemized into the constituent units based on the configuration of the computer network. As a result, conditions of the power consumption of the computer network can be assessed by the managing apparatus.

A method for managing a computer network, according to an aspect of the invention, includes: collecting power consumption information from a connecting device. The power consumption information shows power consumption of the connecting device, and the connecting device interconnects a plurality of communication paths in the computer network. The method further includes: calculating power consumption of the computer network based on the collected power consumption information. The calculated power consumption is itemized into constituent units based on a configuration of the computer network. The method further includes: displaying the calculated power consumption. According to the method in this aspect, the power consumption of the computer network can be displayed by being itemized into the constituent units based on the configuration of the computer network. As a result, conditions of the power consumption of the computer network can be assessed.

An aspect of the invention is not limited to a network system, a connecting apparatus, a managing apparatus and managing method, and may be applied to other aspect including other network apparatus different from the connecting apparatus, a program for causing a computer to execute a function of the connecting apparatus, and a program for causing a computer to execute a function of a managing apparatus. The invention should not be construed as limited to the aspects set forth hereinabove, and naturally various aspects of the invention may be enabled without departing from the scope of the invention.

These and other objects, features, aspects, and advantages of the invention will become more apparent from the following detailed description of the preferred embodiments with the accompanying drawings.

BRIEF DESCRIPTION OF THE DRAWINGS

The invention will be described with reference to the accompanying drawings in which.

DESCRIPTION OF THE PREFERRED EMBODIMENTS

A better understanding of the design and advantages of the invention set forth above will be provided through the following description of the invention embodied in a computer network.

A. Embodiment 1

A1. Computer Network Configuration

Figure 1:
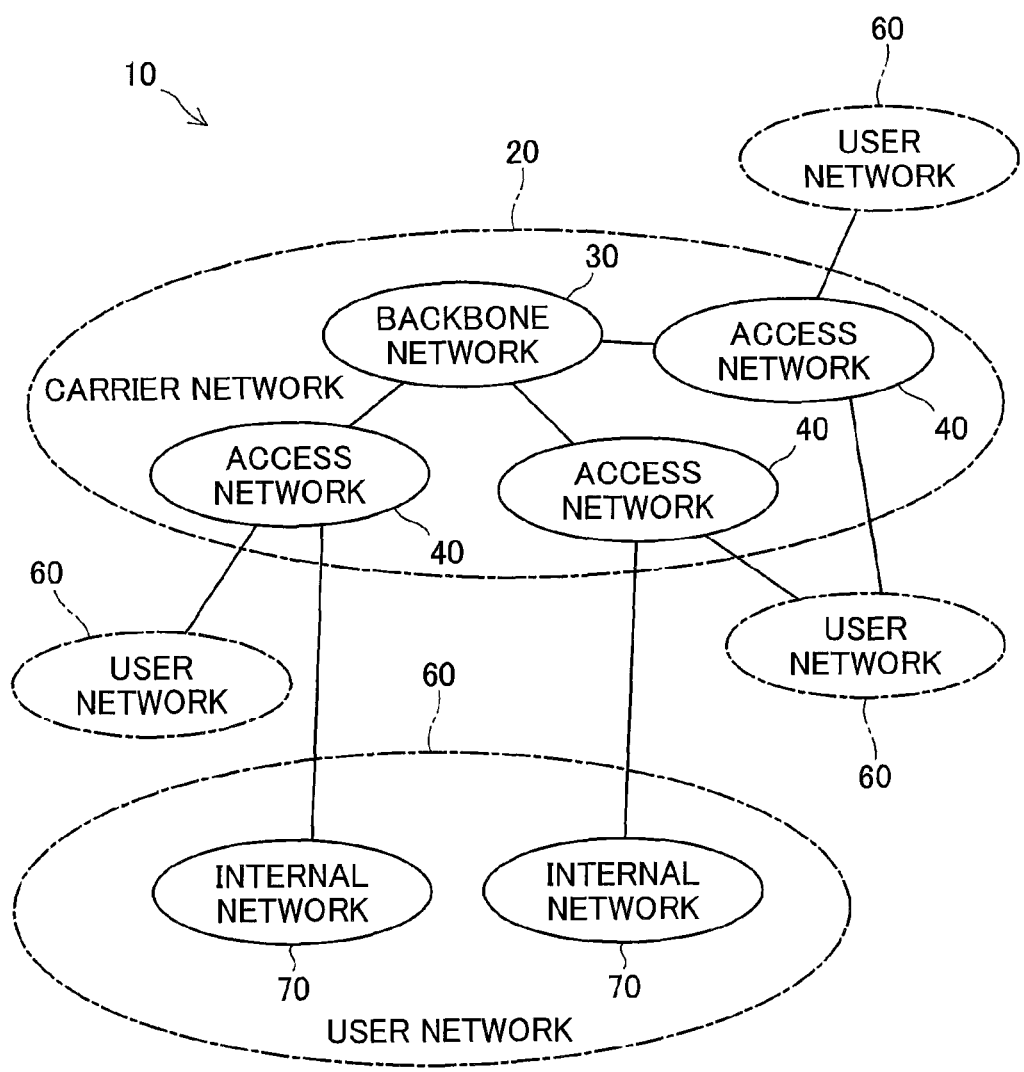
FIG. 1 is an illustration showing a configuration of a computer network.

FIG. 1 is an illustration showing a configuration of a computer network 10. The computer network 10 is a network system that includes a carrier network 20 and user networks 60. While FIG. 1 shows a single carrier network 20 and four user networks 60, the carrier network 20 and user networks 60 are not limited to the numbers illustrated in FIG. 1, with a single, or two or more, of each network type being acceptable.

The carrier network 20 of the computer network 10 is operated by a telecommunications provider, and constitutes a network system that provides the user networks 60 with communication services such as Internet connectivity and point-to-point connections. The carrier network 20 includes a backbone network 30 and access networks 40. The backbone network 30 is a trunk network that interconnects the plurality of access networks 40. The access network 40 is a relay network for relaying information between the backbone network 30 and the user network 60. While FIG. 1 shows a single backbone network 30 and three access networks 40, the backbone network 30 and access networks 40 are not limited to the numbers illustrated in FIG. 1, with a single, or two or more, of each network type being acceptable.

The user network 60 of the computer network 10 is a network system that is operated by a customer, for example an enterprise, an institution or an individual, who subscribe to the communications services of the carrier network 20. The user network 60 includes one or more internal networks 70 located in a block of buildings or sites. The user network 60 may constitute a wide area network (WAN) interconnected with another user network 60 through the carrier network 20. In the user network 60, there may be set up a local area network (LAN), or additionally a virtual LAN (VLAN), which represents a virtual network in which a virtual network group is set up independently of actual physical connections in the LAN. A virtual private network (VPN) in which the plurality of internal networks 70 in the user network 60 are linked together through the backbone network 30 of the carrier network 20 may be provisioned as well.

Figure 2:
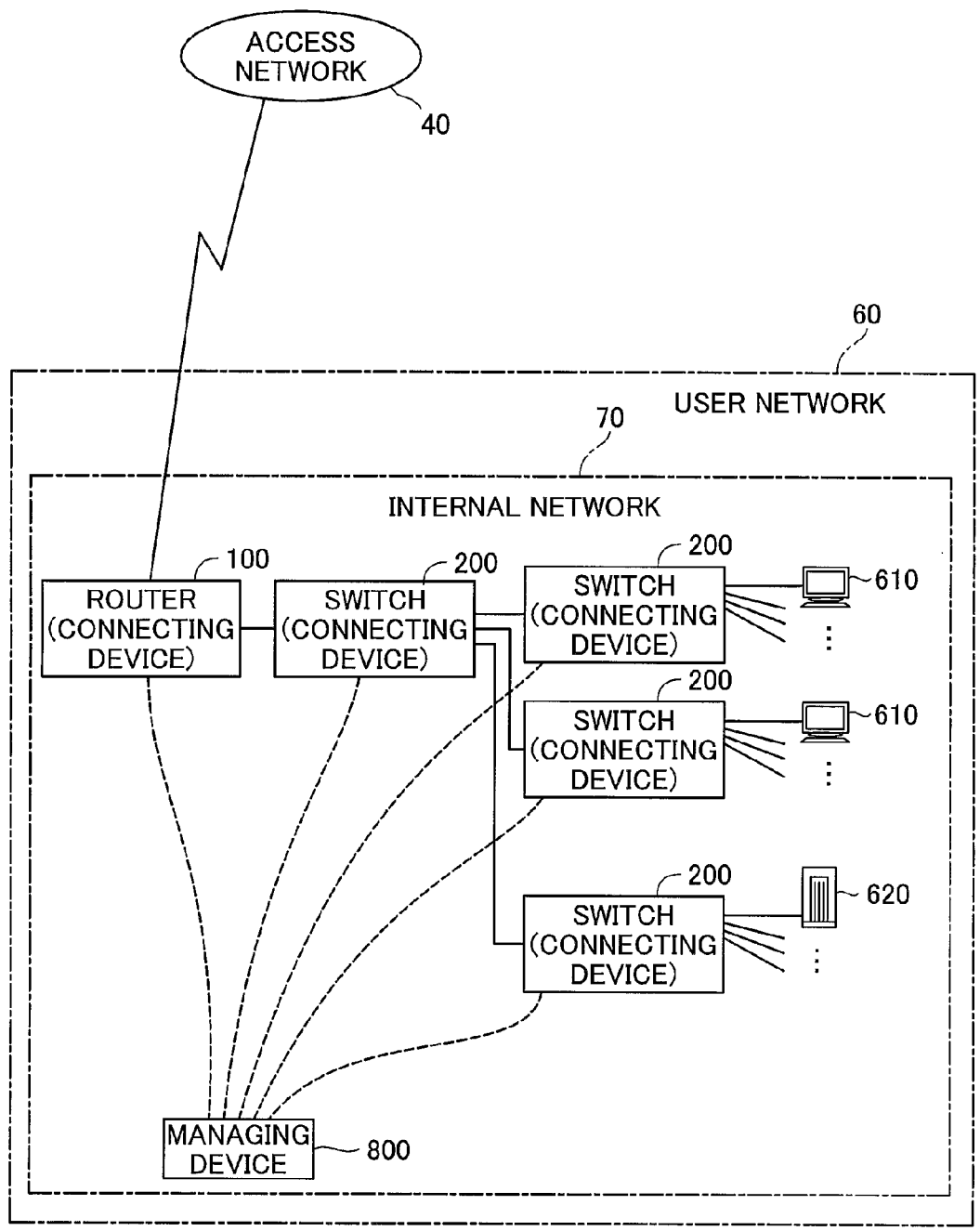
FIG. 2 is an illustration showing a configuration of an internal network in the user network.

FIG. 2 is an illustration showing a configuration of the internal network 70 in the user network 60. The internal network 70 is a network system that includes a router 100, switches 200, client computers 610, a server computer 620, and a managing device 800. While FIG. 2 shows a single router 100 and several switches 200, the router 100 and the switches 200 are not limited to the numbers shown in FIG. 2, with a single, or two or more, of each device type being acceptable.

The router 100 and the switch 200 of the internal network 70 are connecting devices that interconnect a plurality of communication paths in the computer network 10. The router 100 is a connecting device that interconnects between the internal network 70 and the access network 40. The switch 200 is a connecting device that determines destinations for packets flowing on the internal network 70 to relay the packets.

The switch 200 may be directly connected to a client computer 610 and/or a server computer 620. The switch 200 may be connected to a client computer 610 and/or a server computer 620 via another switch 200 in a hierarchical configuration. The switch 200 may be a layer 2 switch (a L2 switch) that determines a destination of a packet based on data in the data link layer (the 2nd layer) of the OSI (Open Source Initiative) model. The switch 200 may be a layer 3 switch (a L3 switch) that determines a destination of a packet based on the network layer (the 3rd layer) of the OSI model.

Figure 3:
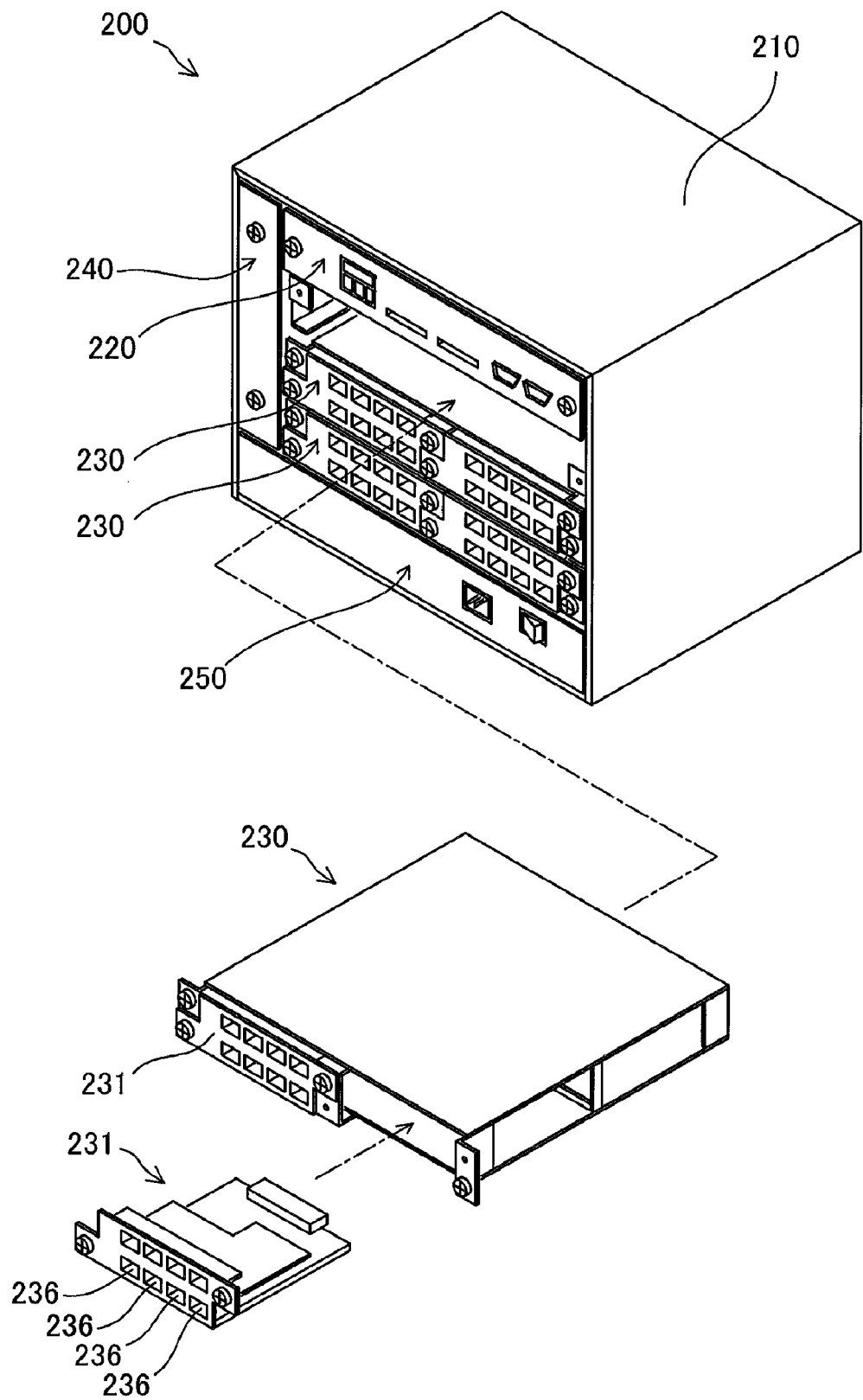
FIG. 3 is an assembly perspective view showing in detail a configuration of a switch.

FIG. 3 is an assembly perspective view showing in detail a configuration of the switch 200. The switch 200 includes a main housing 210, a master control unit 220, a switching unit 230, a fan unit 240, and a power supply unit 250.

The main housing 210 of the switch 200 houses a functional unit that executes various functions, such as the master control unit 220, the switching unit 230, the fan unit 240, and the power supply unit 250. The master control unit 220 of the switch 200 includes a module board into which various electronic components, such as a control panel, a memory card slot and various connection ports, are integrated, and controls various parts of the switch 200.

The switching unit 230 of the switch 200 includes module boards 231 into which various electronic components including interface ports 236 for processing packet switching are integrated. In the present embodiment, the switching unit 230 includes two module boards 231, however, in an alternative embodiment, the switching unit 230 may include a single module board 231, or more than two module boards 231.

The fan unit 240 of the switch 200 includes a module board into which various electronic components including a fan unit are integrated, and cools the various functional units in the switch 200. The power supply unit 250 of the switch 200 includes a module board into which various electronic components including a power supply circuit, and supplies electric power to the various functional units in the switch 200.

Figure 4:
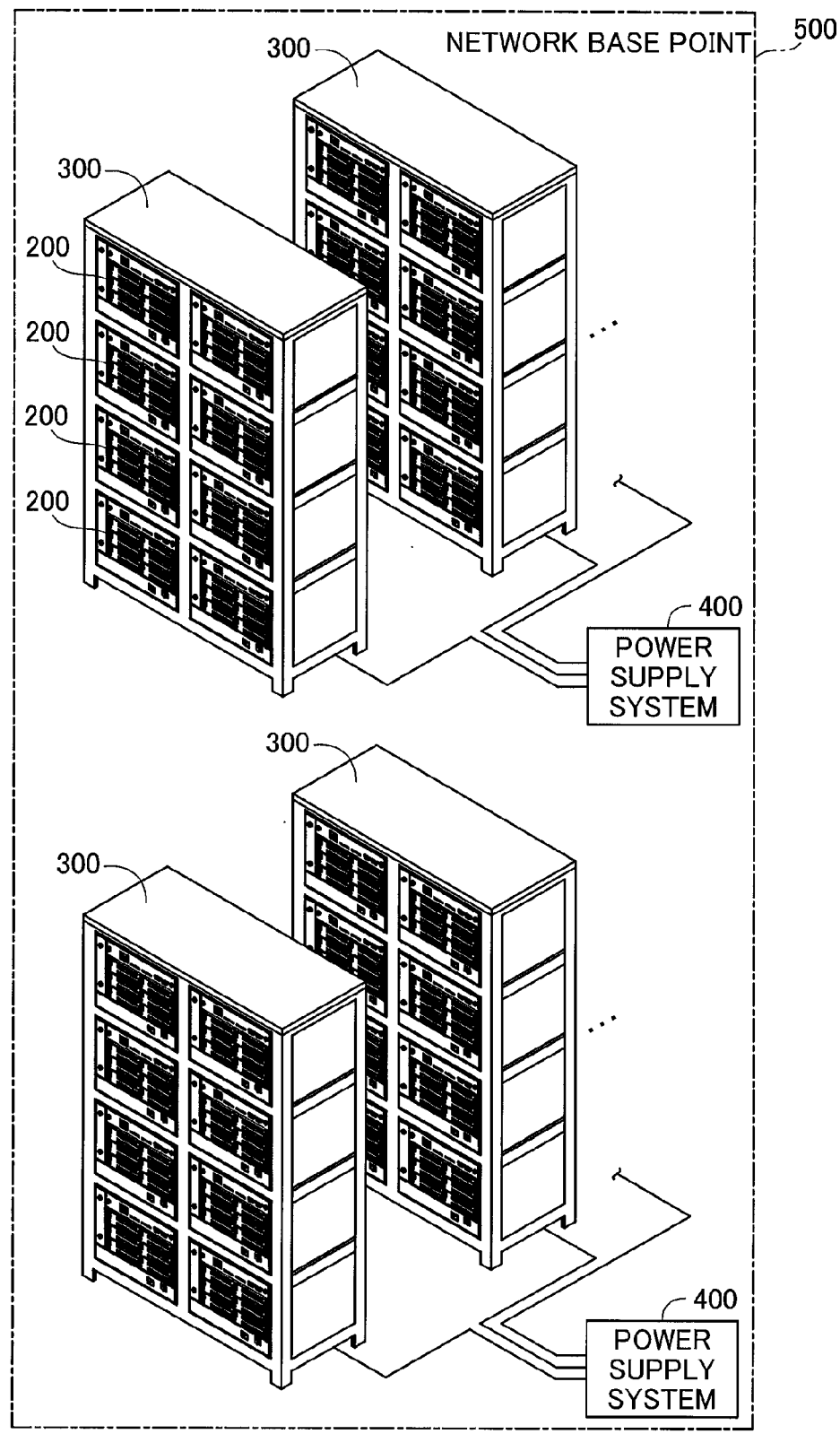
FIG. 4 is an illustration showing a network base point in which switches are installed.

FIG. 4 is an illustration showing a network base point 500 in which the switches 200 are installed. The network base point 500 is a building or an area in which various networking devices making up the internal network 70 are installed. At the network base point 500, storage racks 300 are installed, and the storage rack 300 can house a plurality of switches 200. In the present embodiment, all of the various networking devices making up the internal network 70 are installed at a single network base point 500; however, in an alternative embodiment, the various networking devices making up the internal network 70 may be distributed among a plurality of network base points 500. While in the present embodiment the network base point 500 includes a plurality of power supply systems 400 for supplying electric power to the connecting devices, in another embodiment, a single power supply system 400 would be acceptable.

Figure 5:
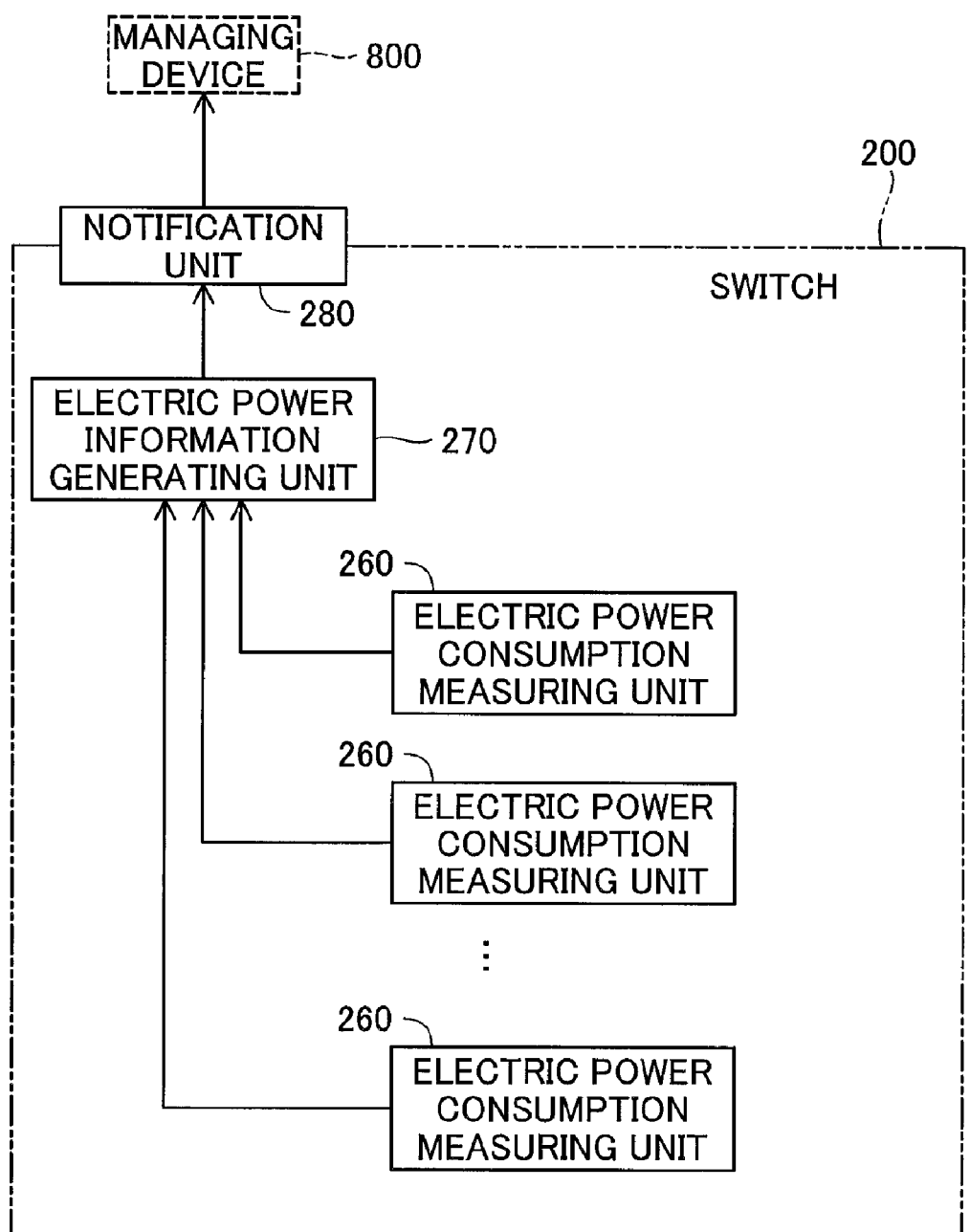
FIG. 5 is an illustration showing a functional configuration of the switch.

FIG. 5 is an illustration showing a functional configuration of the switch 200. The switch 200 includes an electric power consumption measuring unit 260, an electric power information generating unit 270, and a notification unit 280. In the present embodiment, the functions of the electric power consumption measuring unit 260, the electric power information generating unit 270, and the notification unit 280 are accomplished by electronic circuits of the switch 200 through operation based on their physical circuit design, however, in an alternative embodiment, at least one of the functions of the switch 200 may be accomplished through operation of a CPU (central processing unit) based on a program.

The electric power consumption measuring unit 260 of the switch 200 measures electric power consumption which shows electric power consumed in the various electronic components in the switch 200. In the present embodiment, each of the electric power consumption measuring units 260 is individually installed with each of the electronic components of the switch 200, and measures each electric power consumption based on voltage and current being supplied to each electronic component. In the present embodiment, electronic components whose electric power consumption are measured by the electric power consumption measuring units 260 include electronic components such as the interface port 236 of the switching unit 230, as well as on-board electronic components of the functional units, namely, the master control unit 220, the switching unit 230, the fan unit 240, and the power supply unit 250.

The electric power information generating unit 270 of the switch 200 generates power consumption information based on the electric power consumption values of the parts of the switch 200 measured by the electric power consumption measuring units 260. The generated power consumption information shows electric power consumption indicating electric power consumed in the switch 200, and is itemized into constituent units based on a configuration of the switch 200. In the present embodiment, the electric power information generating unit 270 functions as a first generating unit that generates power consumption information based on measured electric power values of the parts of the switch 200. In the present embodiment, the electric power information generating unit 270 is constituted by the master control unit 220.

The notification unit 280 of the switch 200 notifies, through the internal network 70, the managing device 800 of the power consumption information generated by the electric power information generating unit 270. In the present embodiment, the notification unit 280 is constituted by the master control unit 220.

The configuration of the router 100 of the internal network 70 is similar to the configuration of the switch 200 shown in FIGS. 3 to 5, apart from including a functional unit for interconnecting between networks. The operations of the router 100 and the switch 200 are described in more detail later.

Figure 6:
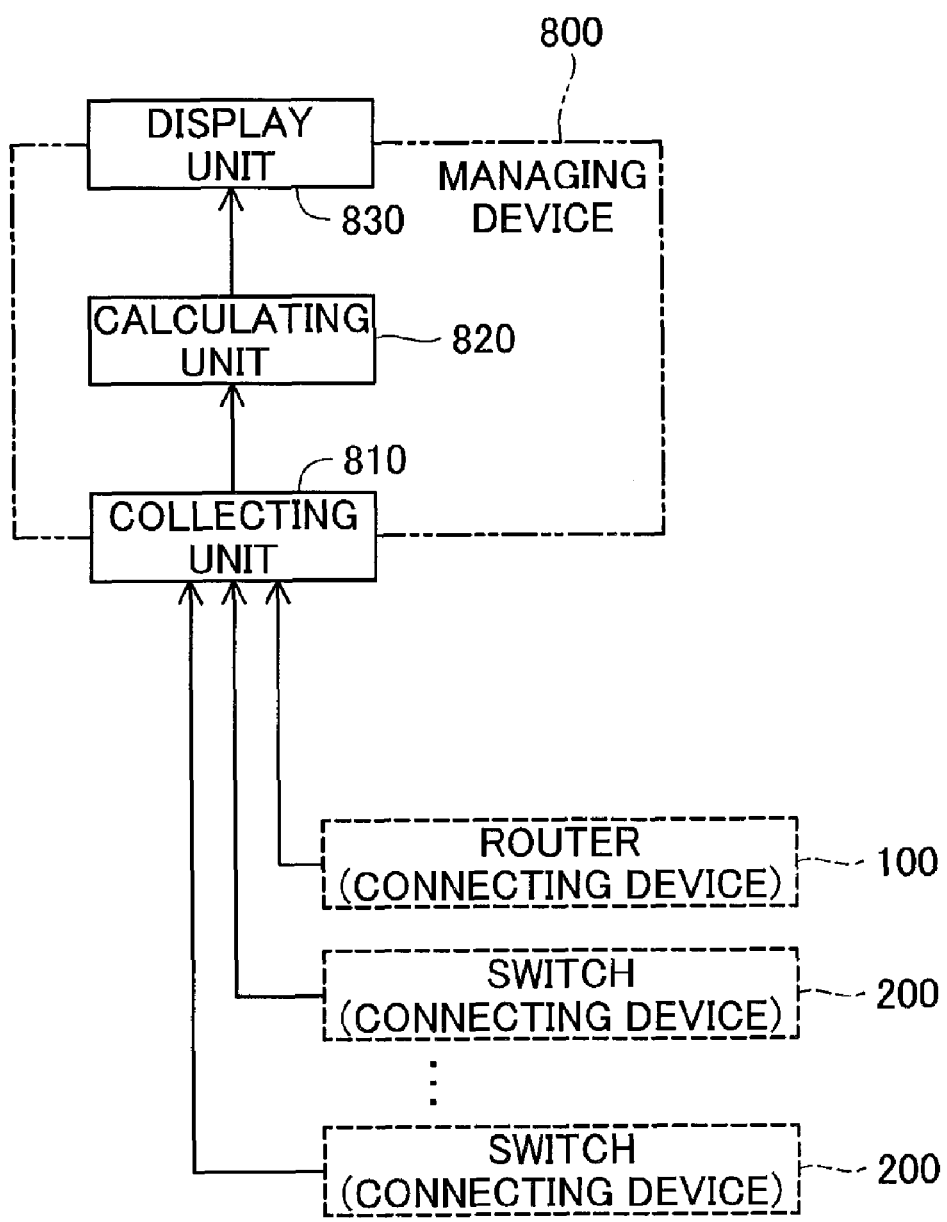
FIG. 6 is an illustration showing a functional configuration of the managing device.

FIG. 6 is an illustration showing a functional configuration of the managing device 800. The managing device 800 of the internal network 70 is a computer that manages the internal network 70. The managing device 800 includes a collecting unit 810, a calculating unit 820, and a display unit 830. In the present embodiment, the functions of the collecting unit 810, the calculating unit 820, and the display unit 830 of the managing device 800 are accomplished through operation of a CPU based on a program, however, in an alternative embodiment, at least one of the functions of the managing device 800 may be accomplished by electronic circuits of the managing device 800 through operation based on the physical circuit design.

The collecting unit 810 of the managing device 800 collects, from the router 100 and the switches 200, power consumption information shows electric power consumption of the router 100 and the switches 200. In the present embodiment, the collecting unit 810 functions as a first collecting unit that collects, as the power consumption information, actual measured information shows power consumption values which are actually measured in various parts of the router 100 and the switches 200.

The calculating unit 820 of the managing device 800 calculates power consumption of the internal network 70 based on the power consumption information collected by the collecting unit 810, and the calculated power consumption is itemized into constituent units based on a configuration of the internal network 70. In the present embodiment, the calculating unit 820 functions as a first calculating unit that calculates power consumption of the internal network 70 itemized into constituent units based on a hardware configuration of the internal network 70.

The display unit 830 of the managing device 800 displays the power consumption calculated by the calculating unit 820. The operation of the managing device 800 is discussed in detail later.

A2. Operation of Computer Network

Figure 7:
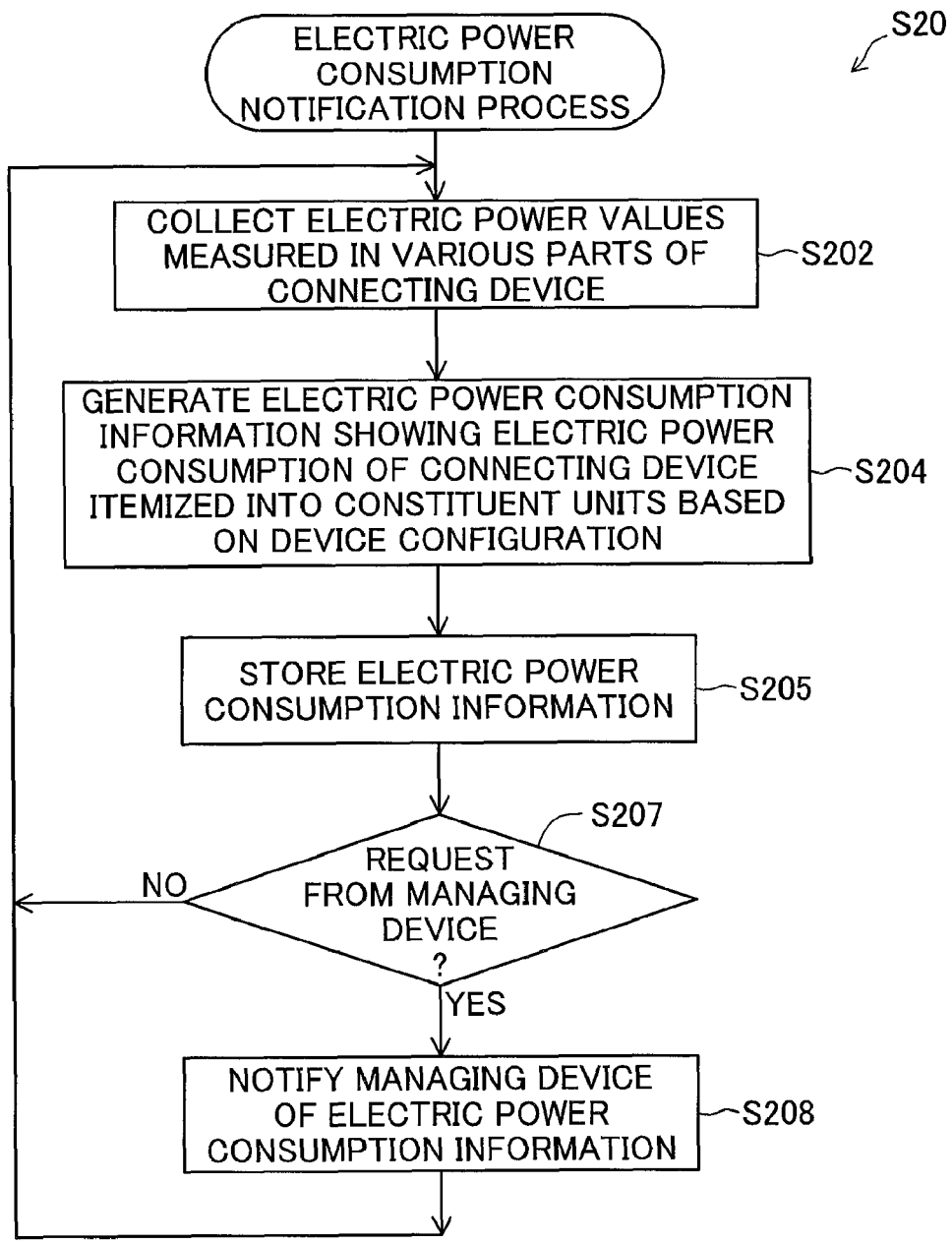
FIG. 7 is a flowchart showing a power consumption notification process executed by the switch of the internal network.

FIG. 7 is a flowchart showing a power consumption notification process (Step S20) executed by the switch 200 of the internal network 70. The power consumption notification process (Step S20) is a process for notifying the managing device 800 of the power consumption of the switch 200. In the present embodiment, the switch 200 initiates the power consumption notification process (Step S20) when powered on.

When the power consumption notification process (Step S20) is initiated, the electric power information generating unit 270 of the switch 200 collects electric power values which are metered by the electric power consumption measuring units 260 (Step S202), and the electric power consumption measuring units 260 are installed with the electronic components of the switch 200.

Then, the electric power information generating unit 270 of the switch 200 generates power consumption information showing electric power consumption of the switch 200, and the generated power consumption information is itemized into the constituent units based on the configuration of the switch 200 (Step S204). In the present embodiment, the electric power information generating unit 270 generates power consumption information showing electric power consumption of the switch 200, itemized into each of the various electronic components in the switch 200, based on actual measured information shows power consumption values which are actually measured in various parts of the switch 200 by the electric power consumption measuring units 260. In the present embodiment, the power consumption information generated by the electric power information generating unit 270 includes component-identifying information and power value information, and the component-identifying information is associated with the power value information. The component-identifying information is information for identifying electronic components of the switch 200, and the power value information shows power consumption values which are actually measured in the electronic components of the switch 200.

After generating the power consumption information (Step S204), the notification unit 280 of the switch 200 stores the power consumption information generated by the electric power information generating unit 270 (Step S205). In the present embodiment, the power consumption information is managed as an MIB (Management Information Base) compliant with the SNMP (Simple Network Management Protocol).

When there is a request from the managing device 800 for power consumption information (Step S207: YES), the notification unit 280 of the switch 200, through the internal network 70, notifies the managing device 800 of the power consumption information generated by the electric power information generating unit 270 (Step S208). In the present embodiment, the notification unit 280 notifies the managing device 800 of the power consumption information saved as an MIB, based on an SNMP-compliant MIB request from the managing device 800.

When there is no request for power consumption information (Step S207: NO) from the managing device 800, or after the managing device 800 completes notifying of the power consumption information (Step S208), the switch 200 repeats the process beginning from the step of collecting electric power values from the electric power consumption measuring units 260 (Step S202).

Like the switch 200, the router 100 of the internal network 70 also executes the power consumption notification process of FIG. 7 (Step S20).

Figure 8:
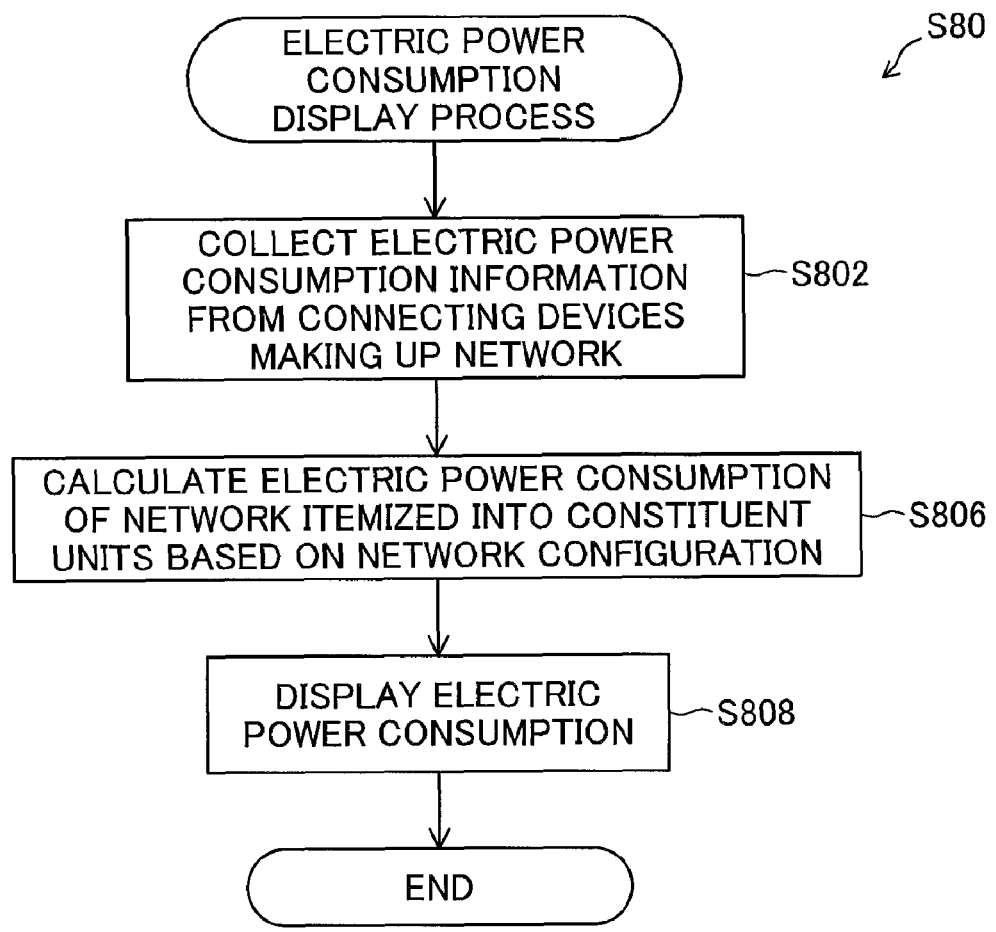
FIG. 8 is a flowchart showing a power consumption display process executed by the managing device of the internal network.

FIG. 8 is a flowchart showing a power consumption display process (Step S80) executed by the managing device 800 of the internal network 70. The power consumption display process (Step S80) is a process for producing a visual display of power consumption of the internal network 70 by the managing device 800. In the present embodiment, the managing device 800 executes the power consumption display process (Step S80) at periodic intervals.

When the power consumption display process (Step S80) is initiated, the collecting unit 810 of the managing device 800 collects, from the router 100 and the switches 200 in the internal network 70, power consumption information showing individual electric power consumption of the router 100 and the switches 200 (Step S802). In the present embodiment, the collecting unit 810 sends a SNMP-based MIB request individually to the router 100 and each of the switches 200, in order to collect the power consumption information which is being managed individually in MIB format in the router 100 and in the switches 200. In the present embodiment, the power consumption information collected by the collecting unit 810 includes component-identifying information for identifying electronic components of the router 100 and the switch 200, and power value information that shows electric power consumption associated with the component-identifying information.

After the step of collecting the power consumption information (Step S802), the calculating unit 820 of the managing device 800 calculates, on the basis of the power consumption information collected by the collecting unit 810, electric power consumption of the internal network 70. The electric power consumption calculated by the calculating unit 820 is itemized into constituent units based on the configuration of the hardware which makes up the internal network 70 (Step S806).

In the present embodiment, the calculating unit 820 calculates the power consumption of the internal network 70 itemized into at least one of the following constituent units (a) to (h):

(a) Each of the various electronic components in the router 100 and the switch 200;
(b) Each of the various module boards in the router 100 and the switch 200;
(c) Each of the various functional units in the router 100 and the switch 200;
(d) Each of the connecting devices including the router 100 and the switch 200;
(e) Each of the storage racks 300 housing the router 100 and the switch 200;
(f) Each of the power supply systems 400 for supplying electric power to the router 100 and the switch 200;
(g) Each of the network base points 500 at which the router 100 and the switch 200 are installed; and
(h) The entire internal network 70.

The power consumption of the constituent units (b) is obtained by summing the power consumption of the constituent units (a). The power consumption of the constituent units (c) is obtained by summing the power consumption of the constituent units (b). The power consumption of the constituent units (d) is obtained by summing the power consumption of the constituent units (c). The power consumption of the constituent units (e) is obtained by summing the power consumption of the constituent units (d). The power consumption of the constituent units (f) is obtained by summing the power consumption of the constituent units (e). The power consumption of the constituent units (g) is obtained by summing the power consumption of the constituent units (f). The power consumption of the constituent unit (h) is obtained by summing the power consumption of the constituent units (g).

After the step of calculating the power consumption of the internal network 70 (Step S806), the display unit 830 of the managing device 800 displays the power consumption calculated by the calculating unit 820 (Step S808). In the present embodiment, the display unit 830 displays the power consumption itemized into constituent units based on the configuration of the internal network 70, in the format of a video image on an image display device such as a liquid crystal display (not shown); in another embodiment, however, the information may be output onto a printing medium through a printer (not shown).

A3. Effects

According to the internal network 70 of the embodiment 1 described above, the power consumption of the internal network 70 can be shown itemized into constituent units based on the configuration of the internal network 70. As a result, actual conditions of the power consumption of the internal network 70 can be assessed.

Further, according to the internal network 70 herein, because the power consumption is shown itemized into hardware-based constituent units which make up the internal network 70, actions intended to limit power consumption from a hardware standpoint can be taken according to actual conditions of the power consumption of the internal network 70.

Additionally, according to the internal network 70 herein, because the power consumption of the internal network 70 is calculated on the basis of the actual measured information which shows the power consumption values actually measured in each parts of the router 100 and the switch 200, the accuracy of calculated power consumption can be improved.

Moreover, according to the internal network 70 herein, because the power consumption is displayed by the managing device 800, an administrator of the internal network 70 can easily assess power consumption conditions of the internal network 70.

According to the router 100 and the switch 200 of the embodiment 1, the power consumption information itemized into constituent units based on the configuration of the router 100 and the switches 200 can be integrated in the managing device 800. As a result, conditions of the power consumption of the internal network 70 composed of the router 100 and the switch 200 can be assessed by the managing device 800.

Additionally, according to the router 100 and the switch 200 herein, because the power consumption information itemized into constituent units based on the hardware making up the router 100 and the switch 200 is generated, the power consumption information itemized into various constituent units relating to hardware configurations of the router 100 and the switch 200 can be integrated in the managing device 800.

B. Embodiment 2

B1. Computer Network Configuration

A configuration of a computer network of an embodiment 2 is similar to the configuration of the embodiment 1, except for different functional configurations in network devices, namely, the router 100, the switch 200, and the managing device 800.

Figure 9:
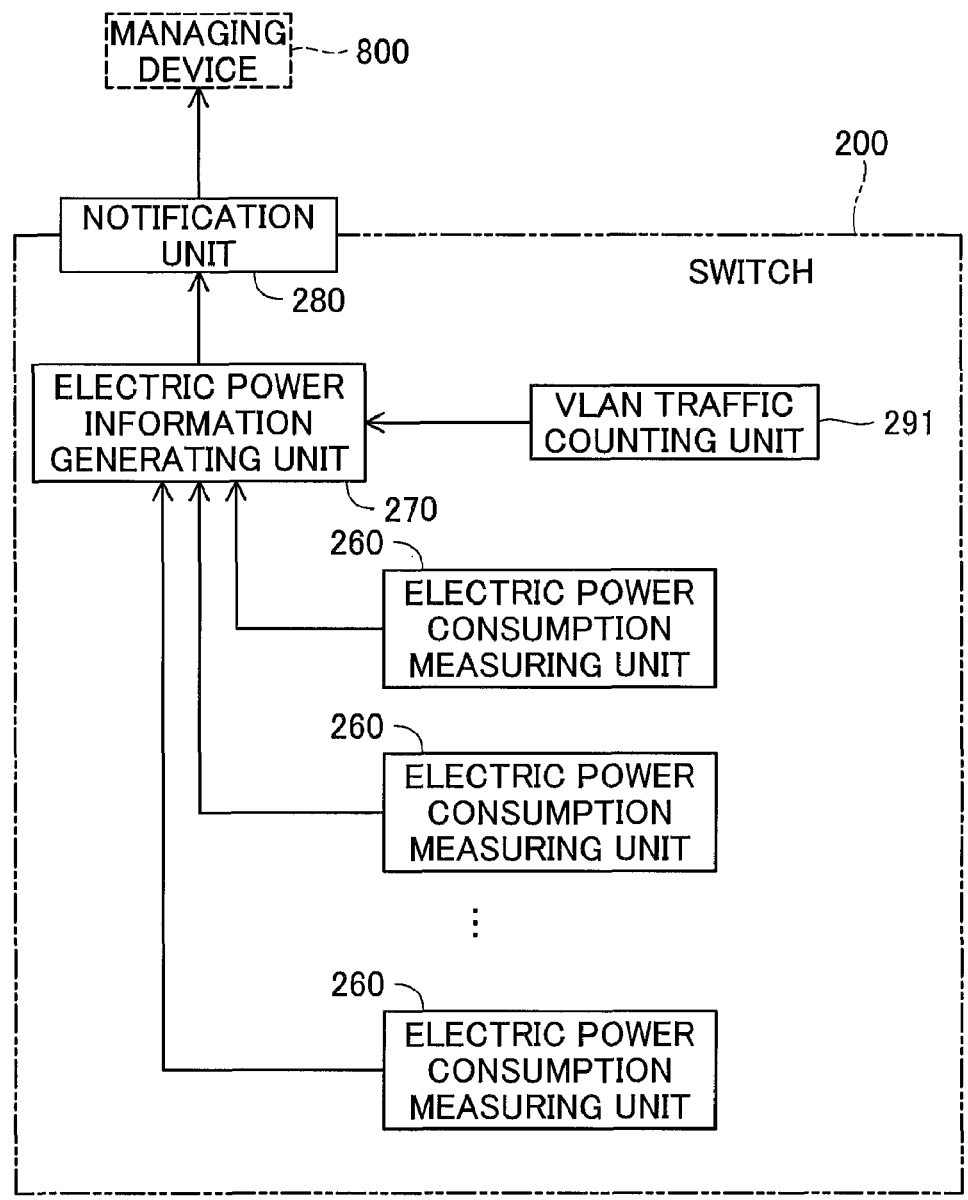
FIG. 9 is an illustration showing a functional configuration of a switch in an embodiment 2.

FIG. 9 is an illustration showing a functional configuration of a switch 200 in the embodiment 2. The switch 200 in the embodiment 2, like that in the embodiment 1, includes electric power consumption measuring units 260, a electric power information generating unit 270, and a notification unit 280. In the embodiment 2 however, the switch 200 is additionally includes a VLAN traffic counting portion 291. The VLAN traffic counting portion 291 counts input/output traffic of each VLAN processed by the switch 200. In the embodiment 2, the electric power information generating unit 270 of the switch 200 notifies the managing device 800 of the power consumption information, as well as notifying the managing device 800 of VLAN traffic volume information which is information based on the input/output traffic of each VLAN counted by the VLAN communications traffic counting portion 291.

A configuration of a router 100 in the embodiment 2 is similar to the configuration of the switch 200 of the embodiment 2 described in FIG. 9, apart from including a functional unit for interconnecting between networks. The operations of the router 100 and the switch 200 of the embodiment 2 are described in more detail later.

Figure 10:
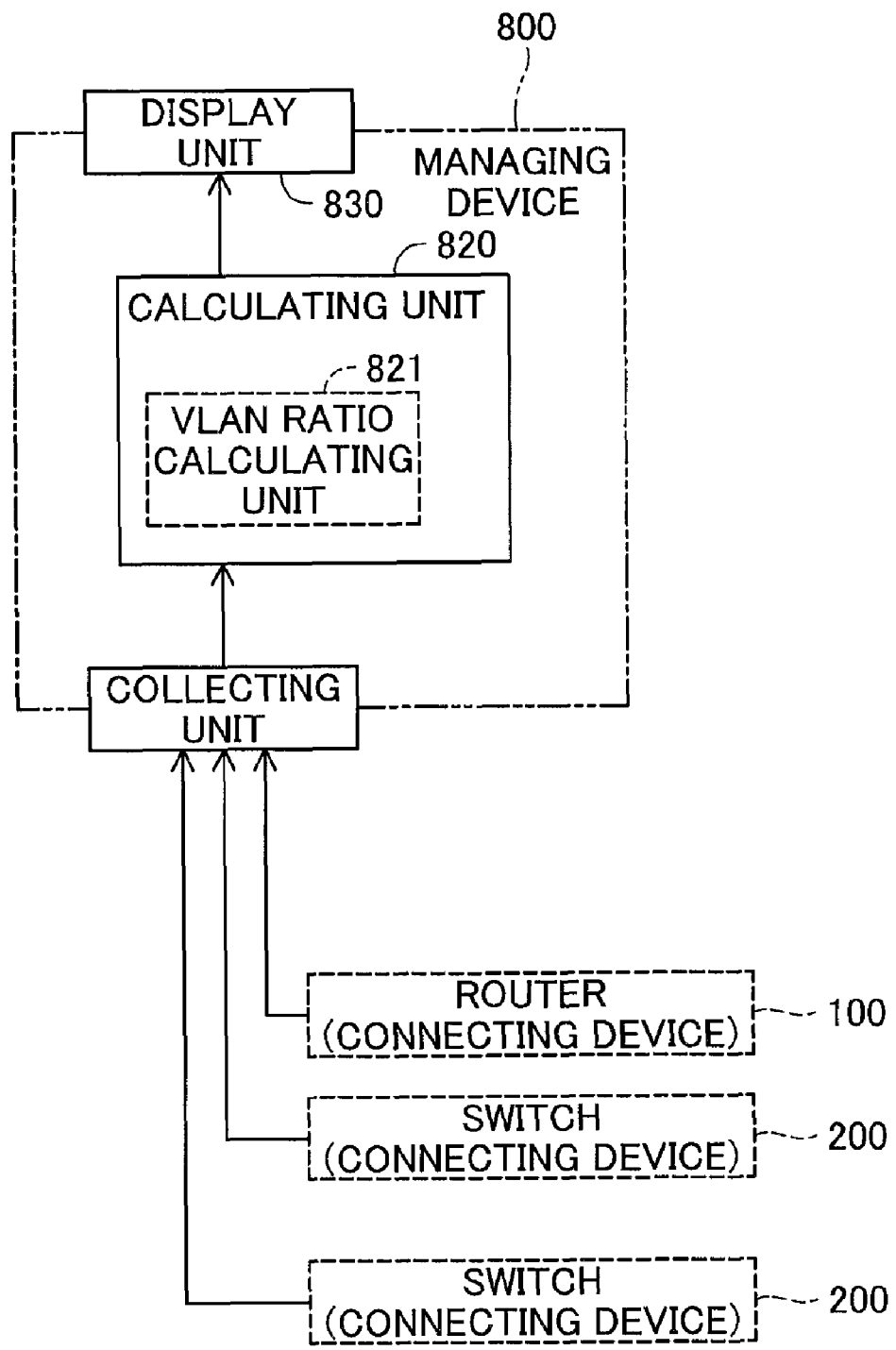
FIG. 10 is an illustration showing a functional configuration of a managing device in the embodiment 2.

FIG. 10 is an illustration showing a functional configuration of a managing device 800 in the embodiment 2. The configuration of the managing device 800 in the embodiment 2, like that of the embodiment 1, is includes a collecting unit 810, a calculating unit 820, and a display unit 830. In the embodiment 2, the calculating unit 820 of the managing device 800 includes a VLAN ratio calculating unit 821. The VLAN ratio calculating unit 821 calculates load ratios showing ratios of traffic volume on individual VLANs, based on VLAN traffic volume information provided by the router 100 and the switch 200. In the embodiment 2, the calculating unit 820 of the managing device 800 functions as a second calculating unit that calculates power consumption of the internal network 70, itemized into VLAN configurations on the internal network 70. The operation of the managing device 800 in the embodiment 2 is discussed in detail later.

B2. Operation of Computer Network

Figure 11:
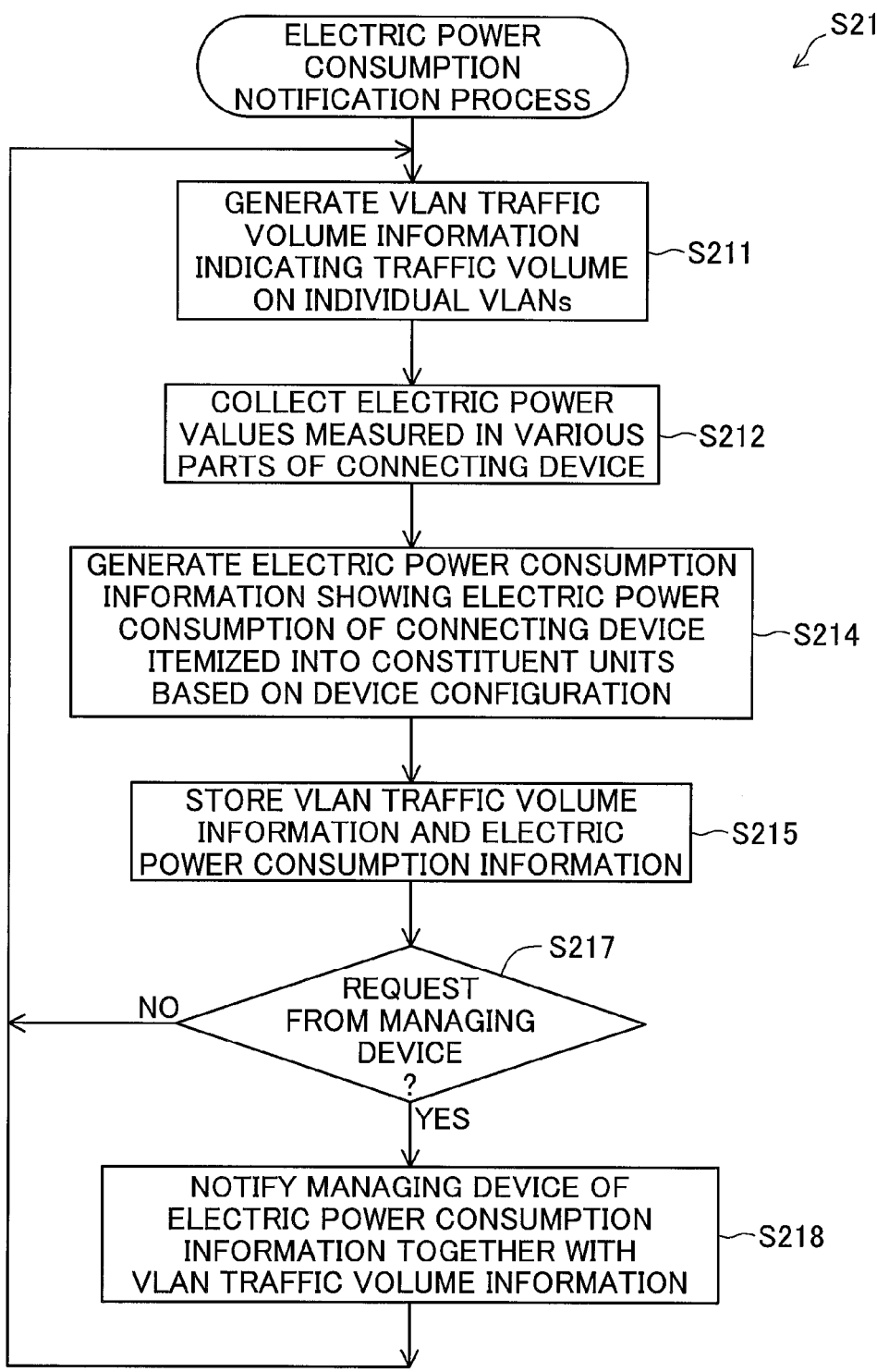
FIG. 11 is a flowchart showing a power consumption notification process executed by the switch in the embodiment 2.

FIG. 11 is a flowchart showing a power consumption notification process (Step S21) executed by the switch 200 in the embodiment 2. The power consumption notification process (Step S21) is a process for notifying the managing device 800 of the power consumption information of the switch 200. In the present embodiment, the switch 200 initiates the power consumption notification process (Step S21) when powered on.

When the power consumption notification process (Step S21) is initiated, the electric power information generating unit 270 of the switch 200 generates VLAN traffic volume information based on input/output traffic on each VLAN counted by the VLAN communications traffic counting portion 291 of the switch 200 (Step S211). The VLAN traffic volume information indicates traffic volume on individual VLANs in the switch 200. In the present embodiment, the VLAN communications traffic counting portion 291 outputs to the electric power information generating unit 270 a count-up number indicating a count of the number of octets and number of packets of the input/output traffic on each VLAN, and on the basis of the count-up number output by the VLAN communications traffic counting portion 291, the electric power information generating unit 270 calculates for each VLAN an average transmission rate (e.g. an average bps (bits per second) rate, or an average pps (packets per second) rate), by way of the VLAN traffic volume information.

After the VLAN traffic volume information is generated (Step S211), the electric power information generating unit 270 of the switch 200 collects the power values which are measured by the electric power consumption measuring units 260 provided to each parts of the switch 200 (Step S212). The electric power information generating unit 270 then generates power consumption information which shows electric power consumption of the switch 200 itemized into constituent units based on the configuration of the switch 200 (Step S214). In the embodiment 2, the electric power information generating unit 270 calculates power consumption of the switch 200 itemized into at least one of the constituent units (a) to (h) mentioned previously.

Once the VLAN traffic volume information and the power consumption information are generated (Steps S211 and S214), the notification unit 280 of the switch 200 stores the VLAN traffic volume information and the power consumption information generated by the electric power information generating unit 270 (Step S215).

If there is a request from the managing device 800 for power consumption information (Step S217: YES), the notification unit 280 of the switch 200, through the internal network 70, notifies the managing device 800 of the VLAN traffic volume information and the power consumption information generated by the electric power information generating unit 270 (Step S218).

If there is no request for power consumption information from the managing device 800 (Step S217: NO), or after the managing device 800 completes the notification of power consumption information (Step S218), the switch 200 repeats the process beginning from the step of generating VLAN traffic volume information (Step S211).

Like the switch 200, the router 100 in the embodiment 2 also executes the power consumption notification process of FIG. 11 (Step S21).

Figure 12:
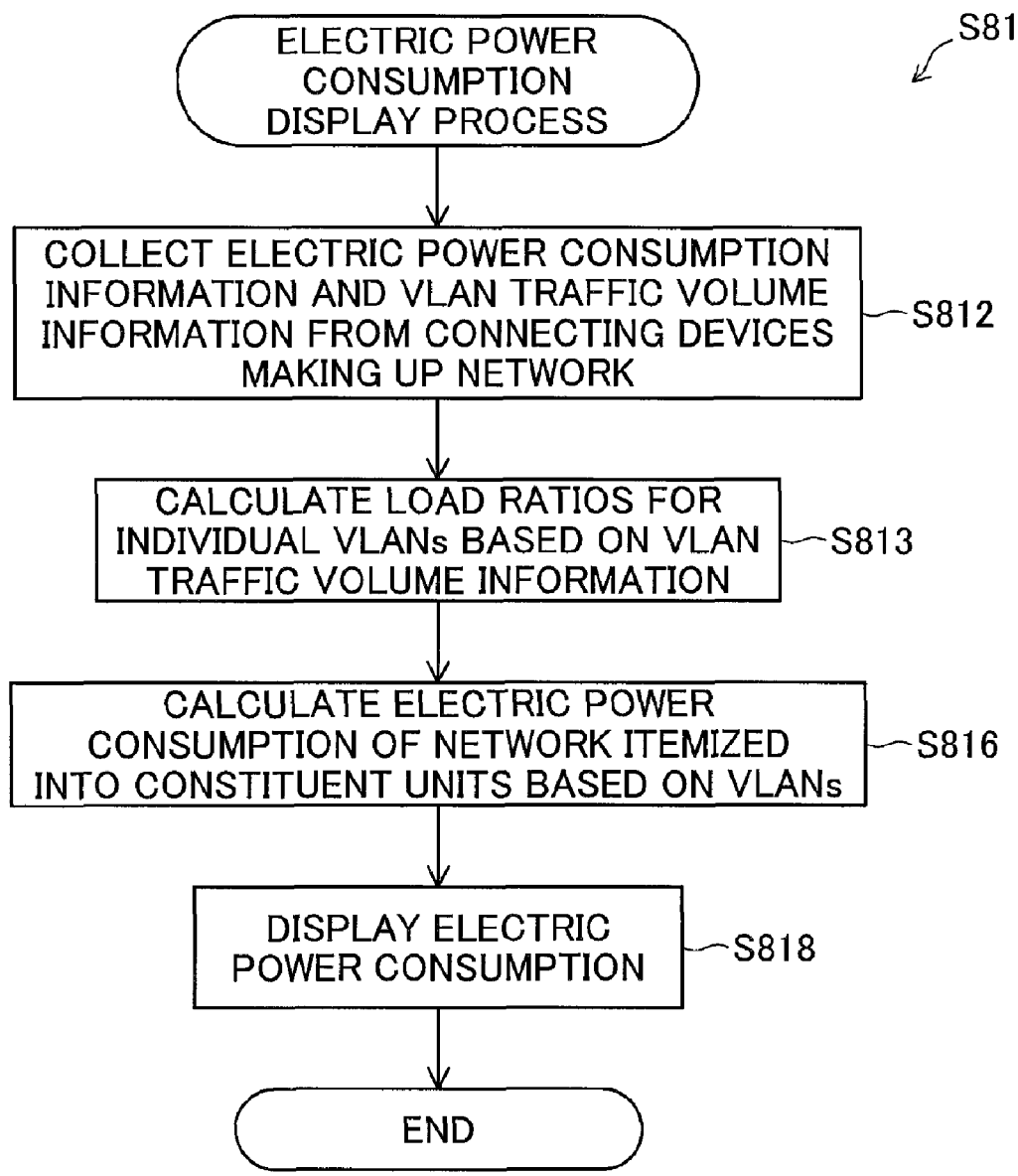
FIG. 12 is a flowchart showing a power consumption display process executed by the managing device in the embodiment 2.

FIG. 12 is a flowchart showing a power consumption display process (Step S81) executed by the managing device 800 in the embodiment 2. The power consumption display process (Step S81) is a process for displaying power consumption of the internal network 70 by the managing device 800. In the present embodiment, the managing device 800 executes the power consumption display process (Step S81) at periodic intervals.

When the power consumption display process (Step S81) is initiated, the collecting unit 810 of the managing device 800 collects, from the router 100 and the switches 200 in the internal network 70, the power consumption information indicating individual electric power consumption of the router 100 and the switches 200, and also collects the VLAN traffic volume information indicating the volume of traffic on individual VLANs in each of the router 100 and the switches 200 (Step S812). In the embodiment 2, the VLAN traffic volume information indicates average transmission rate of individual VLANs in the router 100 and the switches 200.

After the power consumption information and the VLAN traffic volume information are collected (Step S812), on the basis of the VLAN traffic volume information collected from each of the router 110 and the switches 200, the calculating unit 820 of the managing device 800 calculates load ratios which shows ratios of traffic volume on the individual VLANs in the internal network 70 (Step S813). In the present embodiment, after calculating traffic volume on the entire internal network 70 by adding up all of the average transmission rates included in the VLAN traffic volume information which is collected from each of the router 100 and the switches 200, the calculating unit 820 then calculates load ratios showing traffic volume on the individual VLANs with respect to the traffic volume on the entire internal network 70.

After the load ratios of the individual VLANs are calculated (Step S813), on the basis of the power consumption information which is collected by the collecting unit 810, the calculating unit 820 of the managing device 800 calculates power consumption of the internal network 70 itemized into constituent units based on VLANs which are set up in the internal network 70 (Step S816). In the present embodiment, the calculating unit 820 calculates power consumption of individual VLANs in the internal network 70 by first adding up all of the power consumption values included in the power consumption information which is collected from the router 100 and the switches 200 in order to calculate a power consumption value of the entire internal network 70; and then proportionally sharing the power consumption value for the entire internal network 70 in accordance with the load ratios of the individual VLANs.

After power consumption is calculated (Step S816), the display unit 830 of the managing device 800 displays the power consumption calculated by the calculating unit 820 (Step S818).

B3. Effects

According to the internal network 70 in the embodiment 2 described above, the power consumption in the internal network 70 can be displayed itemized into constituent units based on the VLANs which are virtual networks configured in the internal network 70. As a result, measures intended to limit power consumption from a VLAN configuration standpoint can be taken according to actual conditions of power consumption of the internal network 70.

C. Embodiment 3

C1. Computer Network Configuration

A configuration of a computer network of an embodiment 3 is similar to the configuration of the embodiment 1, except for different functional configurations in network devices, namely, the router 100 and the switch 200.

Figure 13:
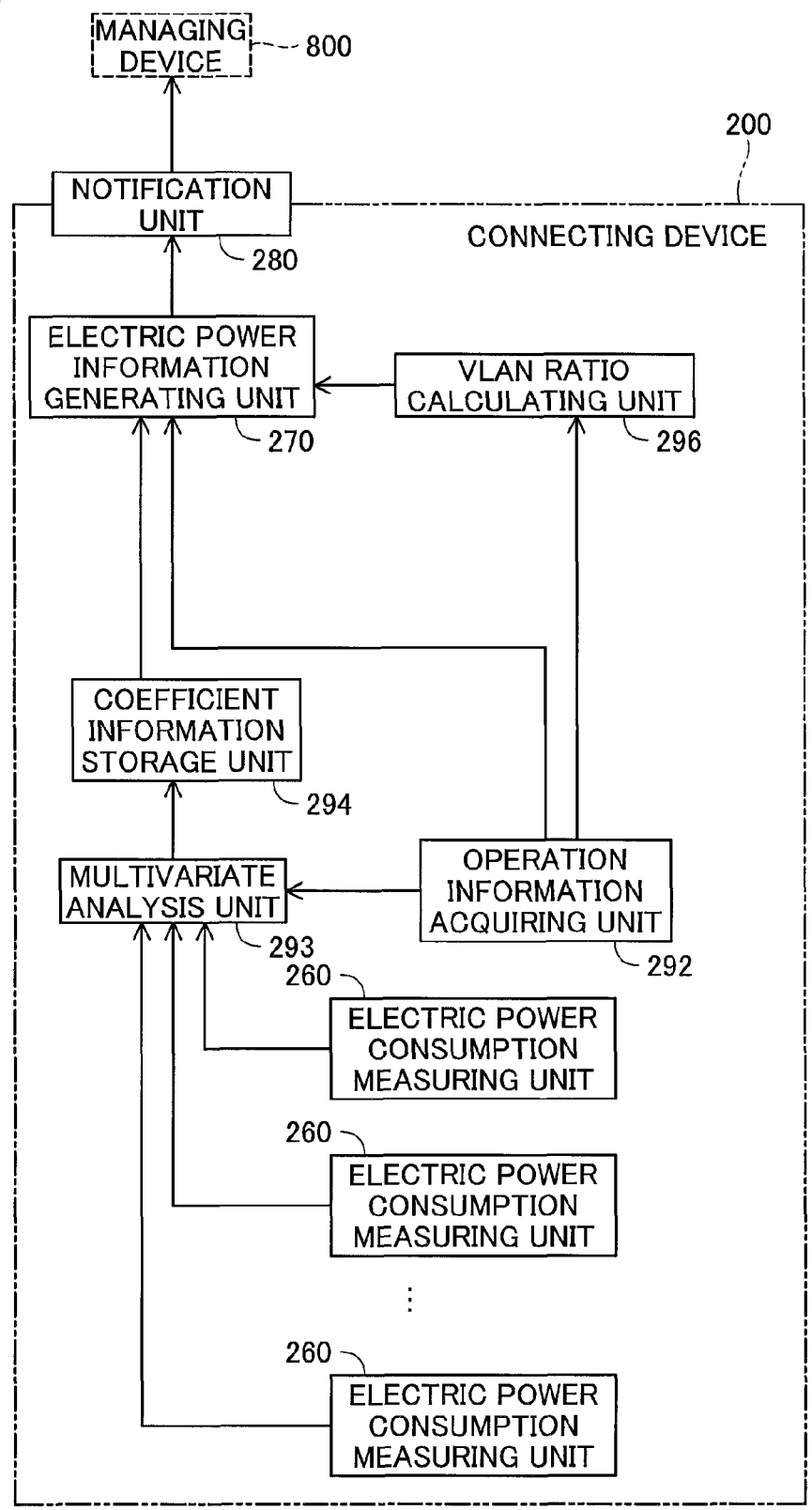
FIG. 13 is an illustration showing a functional configuration of a switch in the embodiment 3.

FIG. 13 is an illustration showing a functional configuration of a switch 200 in the embodiment 3. The switch 200 in the embodiment 3, like that in the embodiment 1, includes the electric power consumption measuring units 260, the electric power information generating unit 270, and the notification unit 280. In the embodiment 3, the switch 200 further includes an operation information acquiring unit 292, a multivariate analysis unit 293, a coefficient information storage unit 294, and a VLAN ratio calculating unit 296.

The operation information acquiring unit 292 of the switch 200 acquires operation information which shows a record of processing operations in the switch 200. The multivariate analysis unit 293 of the switch 200 calculates, using multivariate analysis or a neural network, coefficient information which shows coefficients for estimating electric power consumption of the switch 200, based on the operation information acquired by the operation information acquiring unit 292. The coefficient information storage unit 294 of the switch 200 saves the coefficient information calculated by the multivariate analysis unit 293. The VLAN ratio calculating unit 296 of the switch 200 calculates load ratios which show traffic volume ratios on individual VLANs in the switch 200, based on the operation information acquired by the operation information acquiring unit 292. In the embodiment 3, the electric power information generating unit 270 functions as a second generating unit that generates power consumption information based on operation information acquired by the operation information acquiring unit 292.

A configuration of a router 100 in the embodiment 3 is similar to the configuration of the switch 200 of the embodiment 3 described in FIG. 13, apart from including a functional unit for processing interconnections across networks. Operations of the router 100 and the switch 200 of the embodiment 3 are described in more detail later.

A configuration of a managing device 800 in the embodiment 3 is similar to that in the embodiment 1, except that the calculating unit 820 functions as a second calculating unit that calculates electric power consumption of the internal network 70, itemized into VLAN configuration in the internal network 70.

C2. Operation of Computer Network

Figure 14:
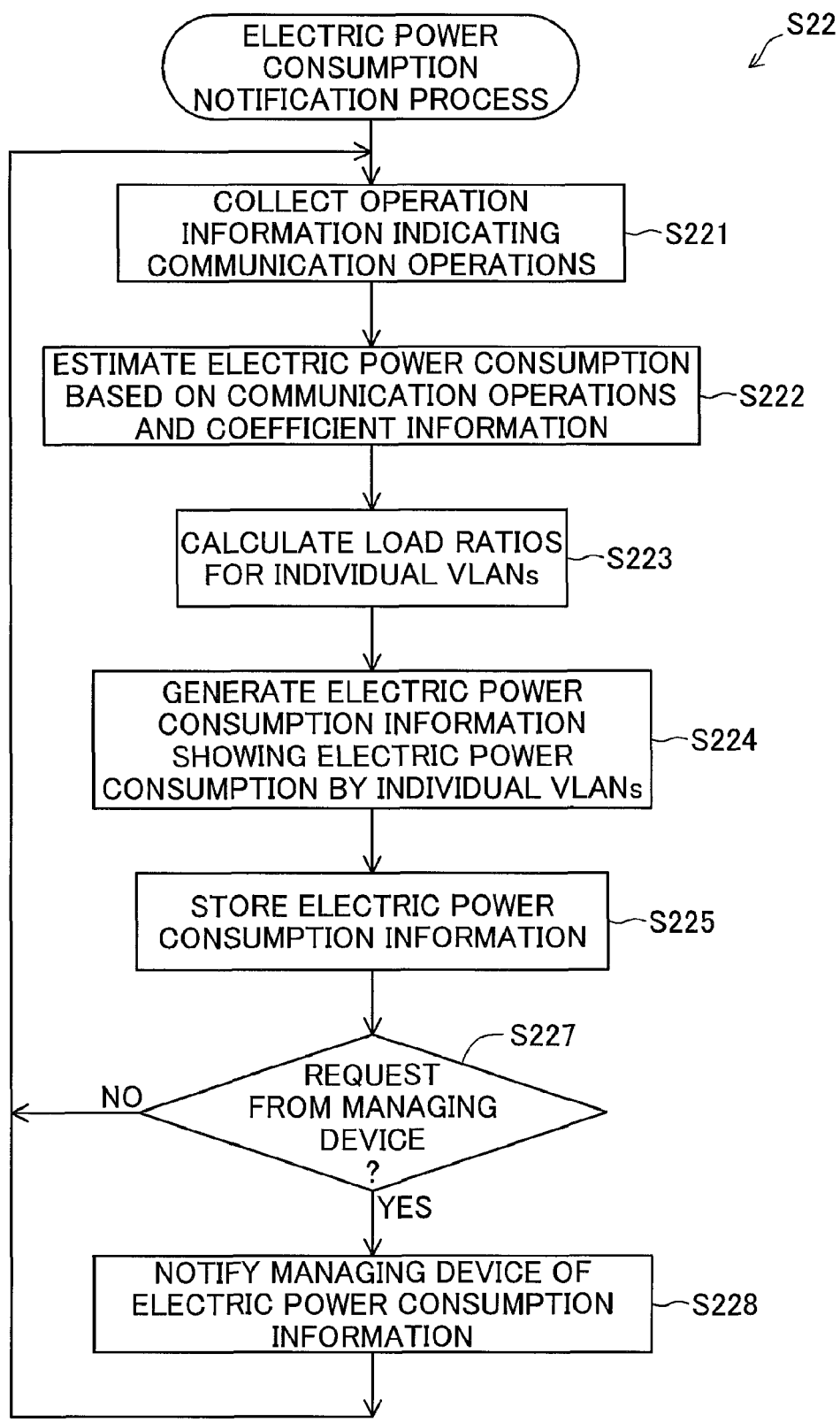
FIG. 14 is a flowchart showing a power consumption notification process executed by the switch in the embodiment 3.

FIG. 14 is a flowchart showing a power consumption notification process (Step S22) executed by the switch 200 in the embodiment 3. The power consumption notification process (Step S22) is a process for notifying the managing device 800 of power consumption information by the switch 200. In the present embodiment, the switch 200 initiates the power consumption notification process (Step S22) when powered on.

When the power consumption notification process (Step S22) is initiated, the operation information acquiring unit 292 of the switch 200 acquires, from the various parts of the switch 200, the operation information which shows the record of processing operations in the switch 200 (Step S221).

The operation information acquired by the operation information acquiring unit 292 includes at least one of the following items of operation information (a) to (i):

(a) Average frame length of input/output traffic in the entire switch 200;

(b) Average pps rate of input/output traffic in the entire switch 200;

(c) Average bps rate of input/output traffic in the entire switch 200;

(d) Average number of accesses to each electronic component in the switch 200;

(e) Number of path entries in the switch 200;

(f) Average number of L2 (Layer 2) relay and L3 (Layer 3) relay process iterations;

(g) Average number of IPv4 (Internet Protocol version 4) and IPv6 (Internet Protocol version 6) process iterations;

(h) Average unicast and multicast process iterations; and (i) Operating mode of the switch 200 (e.g. a normal operating mode, and a power saving operating mode).

Once operating information is acquired (Step S221), the electric power information generating unit 270 of the switch 200 estimates power consumption of the switch 200, based on the operating information acquired by the operation information acquiring unit 292 and the coefficient information saved in the coefficient information storage unit 294 (Step S222). In the present embodiment, the electric power information generating unit 270 calculates power consumption of the switch 200 based on the following relational expression (1).

$$Ps=(a0 \cdot X0)+(a1 \cdot X1)+(a2 \cdot X2)+ \ldots +(an \cdot Xn) \quad (1)$$

'Ps' denotes electric power consumption in the switch 200; 'X1, X2, . . . X3' denote values of various classes of operation information; and 'a1, a2, . . . a3' denote coefficient information values associated with the various classes of operation information.

In accordance with the power consumption calculation (Step S222), the VLAN ratio calculating unit 296 of the switch 200 calculates load ratios showing traffic volume ratios on the individual VLANs in the switch 200, based on the operation information acquired by the operation information acquiring unit 292 (Step S223). In the embodiment 3, the VLAN ratio calculating unit 296 calculates load ratios of the individual VLANs with respect to traffic volume of the entire switch 200, based on information relating to VLAN input/output traffic included in the operation information.

After power consumption and load ratios are calculated (Steps S222, S223), in accordance with the load ratios of the individual VLANs calculated by the VLAN ratio calculating unit 296, the electric power information generating unit 270 of the switch 200 proportionally shares the power consumption of the switch 200 which is calculated on the basis of the aforementioned relational formula (I), to generate power consumption information showing power consumption of the switch 200 itemized into the individual VLANs (Step S224). The notification unit 280 of the switch 200 stores the power consumption information generated by the electric power information generating unit 270 (Step S225).

If there is a request from the managing device 800 for power consumption information (Step S227: YES), the notification unit 280 of the switch 200, through the internal network 70, notifies the managing device 800 of the power consumption information generated by the electric power information generating unit 270 (Step S228).

If there is no request for power consumption information from the managing device 800 (Step S227: NO), or after the managing device 800 completes the notification of power consumption information (Step S228), the switch 200 repeats the process beginning from the step of collecting operating information (Step S221).

Figure 15:
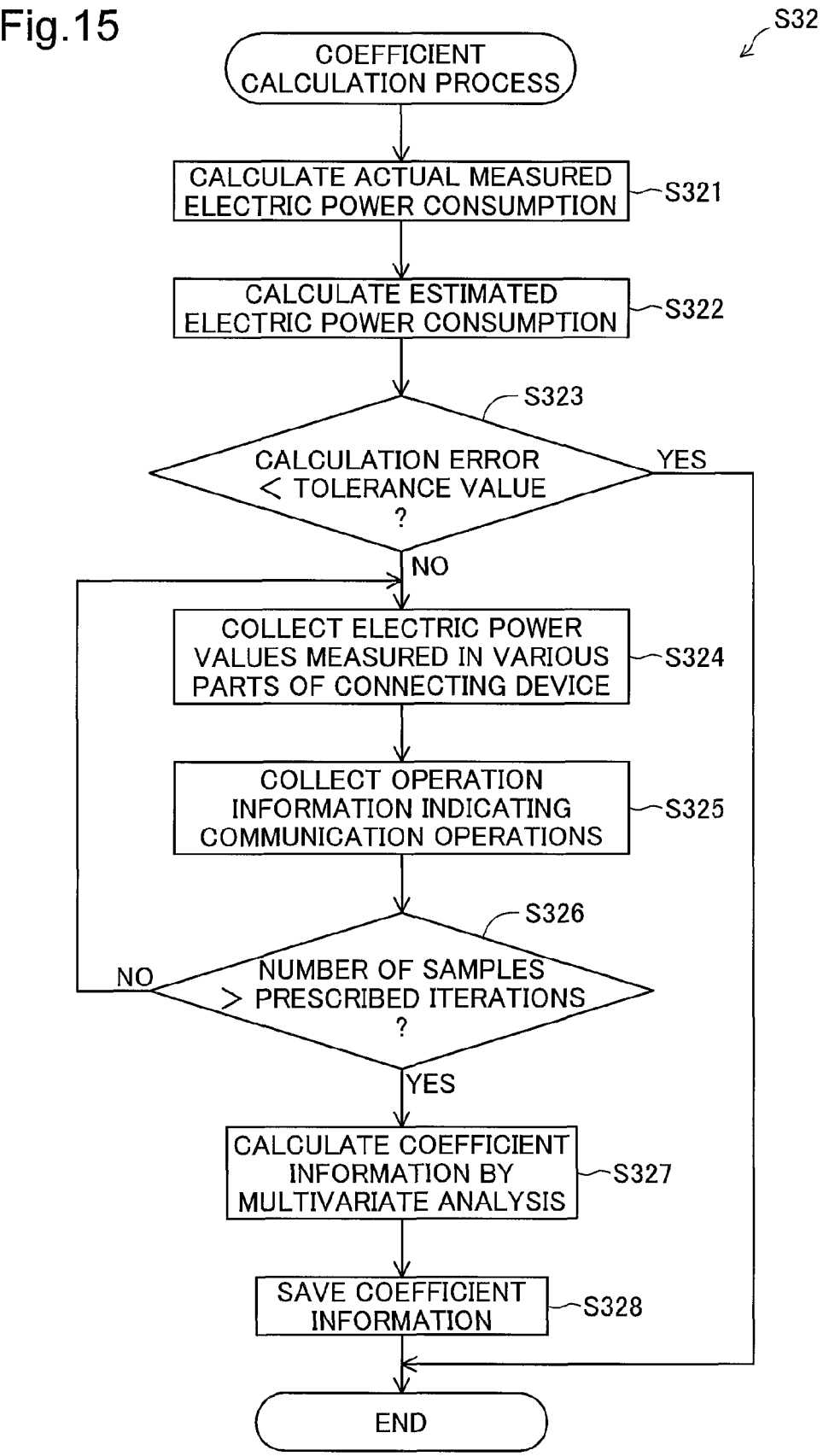
FIG. 15 is a flowchart showing a coefficient calculation process executed by the switch in the embodiment 3.

FIG. 15 is a flowchart showing a coefficient calculation process (Step S32) executed by the switch 200 in the embodiment 3. The coefficient calculation process (Step S32) is a process for calculating coefficients used to estimate power consumption of the switch 200 based on the operation information acquired by the operation information acquiring unit 292. In the present embodiment, the switch 200 executes the coefficient calculation process (Step S32) on a periodic basis.

When the coefficient calculation process (Step S32) is initiated, the multivariate analysis unit 293 of the switch 200 calculates actual measured power consumption which is derived by adding up the power values measured by the electric power consumption measuring units 260 provided to each of the various electronic components in the switch 200 (Step S321). Meanwhile, the electric power information generating unit 270 of the switch 200, using the coefficient information saved in the coefficient information storage unit 294, calculates estimated power consumption based on the operation information acquired by the operation information acquiring unit 292, doing so on the basis of the aforementioned relational expression (1) (Step S322).

Once the actual measured power consumption and the estimated power consumption are calculated (Steps S321, S322), if calculation error between the actual metered power consumption and the estimated power consumption is less than a tolerance value (Step S323: YES) the switch 200 terminates the coefficient calculation process (Step S32).

If on the other hand calculation error between the actual metered power consumption and the estimated power consumption is equal to or greater than the tolerance value (Step S323: NO), the multivariate analysis unit 293 of the switch 200 collects the actual metered power values measured by the electric power consumption measuring unit 260, and the operation information acquired by the operation information acquiring unit 292, until the number of samples is satisfied a prescribed number of iterations (Steps S324, S325). Once the number of samples is satisfied the prescribed number of iterations (Step S326: YES), the multivariate analysis unit 293 processes the collected actual metered power values and the collected operation information by multivariate analysis with a neural network to calculate a coefficients 'a0, a1, . . . , an' in relational expression (1) (Step S327). The multivariate analysis unit 293 then saves the coefficient information which includes the newly calculated coefficients 'a0, a 1, . . . . an' to the coefficient information storage unit 294 (Step S328).

Like the switch 200, the router 100 of the embodiment 3 also executes the power consumption notification process of FIG. 14 (Step S22) and the coefficient calculation process of FIG. 15 (Step S32).

Figure 16:
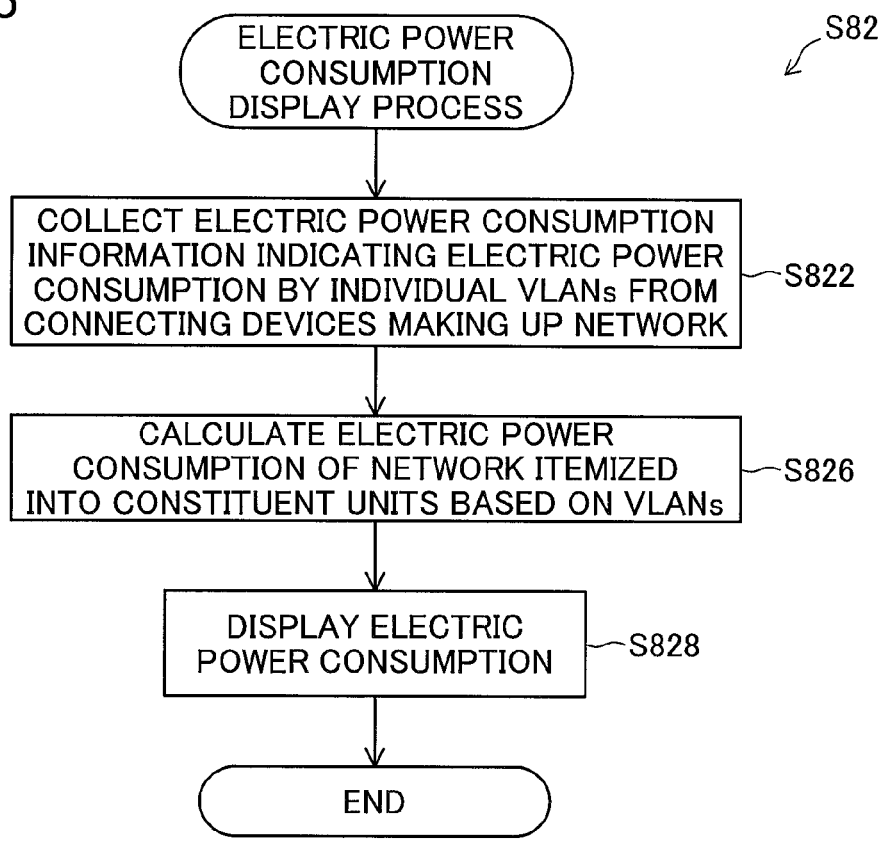
FIG. 16 is a flowchart showing a power consumption display process executed by a managing device in the embodiment 3.

FIG. 16 is a flowchart showing a power consumption display process (Step S82) executed by the managing device 800 in the embodiment 3. The power consumption display process (Step S82) is a process for producing a visual display of power consumption of the internal network 70 by the managing device 800. In the present embodiment, the managing device 800 executes the power consumption display process (Step S82) at periodic intervals.

When the power consumption display process (Step S82) is initiated, the collecting unit 810 of the managing device 800 collects, from the router 100 and from the switches 200 in the internal network 70, power consumption information indicating individual power consumption of the router 100 and the switches 200 (Step S822). In the embodiment 3, the power consumption information collected from the router 100 and the switches 200 by the managing device 800 includes information showing individual power consumption of each of the router 100 and the switches 200, itemized into individual VLANs.

After the power consumption information is collected (Step S822), on the basis of the power consumption information collected by the collecting unit 810, the calculating unit 820 of the managing device 800 calculates power consumption indicating electric power consumed in the internal network 70, itemized into constituent units based on VLANs configured in the internal network 70 (Step S826). In the present embodiment, the calculating unit 820 calculates power consumption for individual VLANs in the internal network 70 by summing up, for each individual ULAN, the power consumption information collected from the router 100 and the switches 200.

After power consumption is calculated (Step S826), the display unit 830 of the managing device 800 displays the power consumption levels which are calculated by the calculating unit 820 (Step S828).

C3. Effects

According to the internal network 70 in the embodiment 3 described above, the power consumption of the internal network 70 can be displayed itemized into constituent units based on VLANs which are virtual networks configured in the internal network 70. As a result, measures intended to limit power consumption from a VLAN configuration standpoint can be taken according to actual conditions of power consumption of the internal network 70.

D. Embodiment 4

D1. Computer Network Configuration

A configuration of a computer network of the embodiment 4 is similar to the configuration of the embodiment 1, except for different functional configurations in network devices, namely, the router 100, the switches 200, and the managing device 800.

Figure 17:
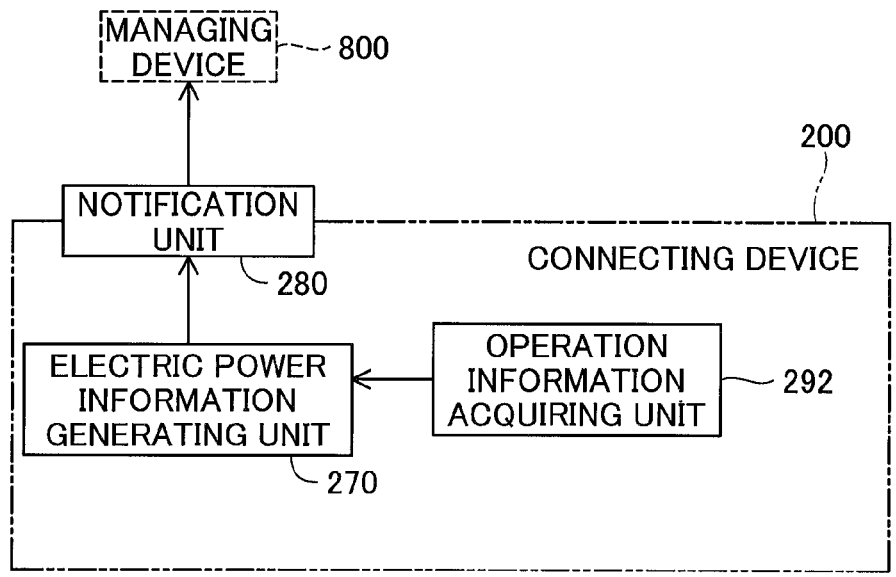
FIG. 17 is an illustration showing a functional configuration of a switch in the embodiment 4.

FIG. 17 is an illustration showing a functional configuration of a switch 200 in the embodiment 4. The switch 200 in the embodiment 4, like that in the embodiment 1, includes the electric power information generating unit 270 and the notification unit 280. In the embodiment 4, the switch 200 further includes an operation information acquiring unit 292 that acquires operation information showing a record of processing operations in the switch 200. In the embodiment 4, the electric power information generating unit 270 of the switch 200 functions as a second generating unit that generates power consumption information which includes the operation information acquired by the operation information acquiring unit 292.

The configuration of the router 100 in the embodiment 4 is similar to that of the switch 200 of the embodiment 4 described in FIG. 17, apart from including a functional unit that interconnections across networks. Operations of the router 100 and the switch 200 of the embodiment 4 are described in more detail later.

Figure 18:
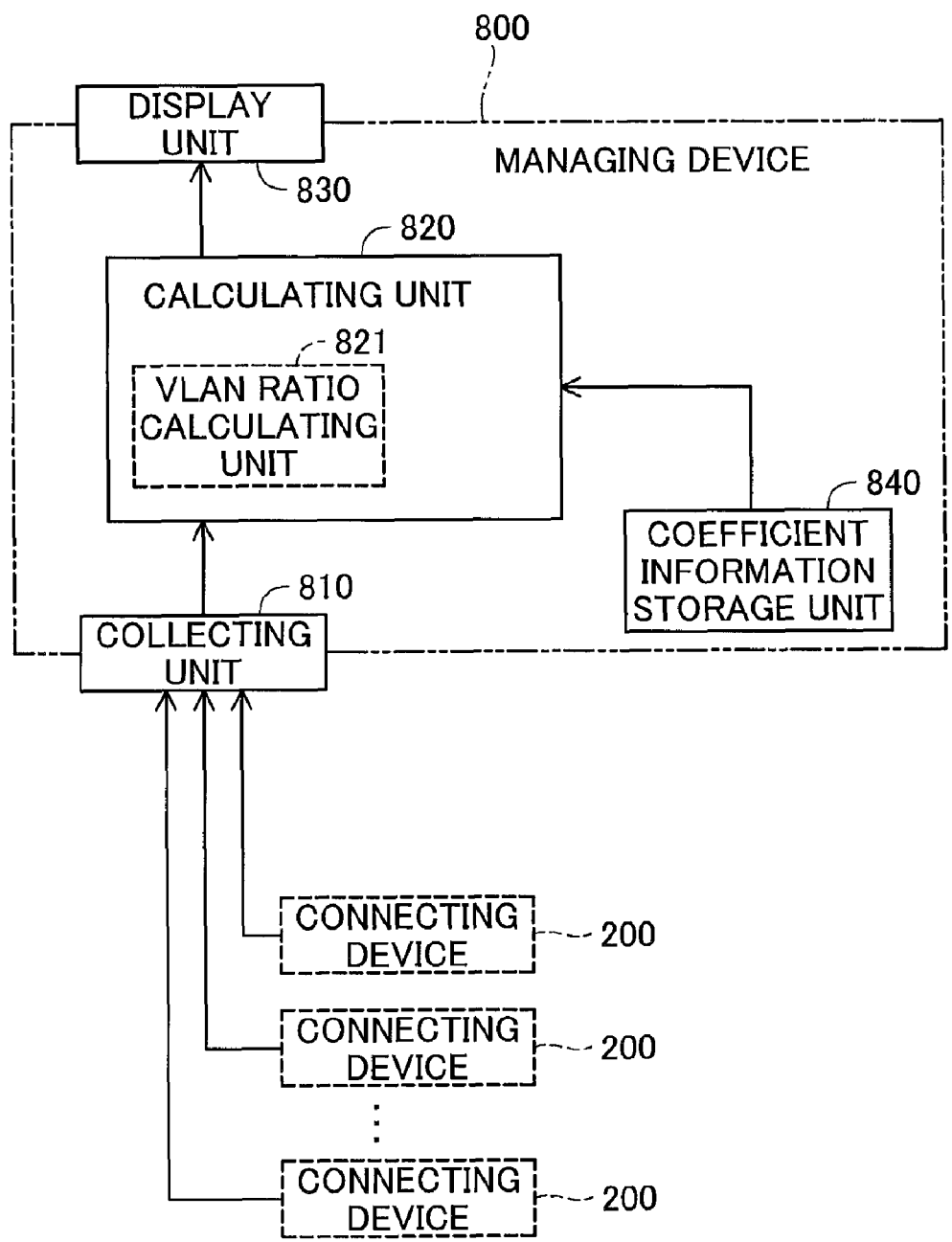
FIG. 18 is an illustration showing a functional configuration of a managing device in the embodiment 4.

FIG. 18 is an illustration showing a functional configuration of a managing device 800 in the embodiment 4. The managing device 800 in the embodiment 4, like that in the embodiment 1, includes the collecting unit 810, the calculating unit 820, and the display unit 830. In the embodiment 4, the managing device 800 further includes a coefficient information storage unit 840 that stored in advance therein coefficient information which is associated with operation information of the router 100 and the switch 200. In the embodiment 4, the coefficient information stored in the coefficient information storage unit 840 is prepared beforehand by an administrator of the internal network 70.

In the embodiment 4, the calculating unit 820 of the managing device 800 includes a ULAN ratio calculating unit 821 that calculates a load ratio shows ratios of traffic volume on individual VLANs, on the basis of ULAN traffic volume information provided by the router 100 and the switch 200. In the embodiment 4, the calculating unit 820 of the managing device 800 functions as a second calculating unit that calculates power consumption of the internal network 70, itemized into ULAN configuration in the internal network 70. Operation of the managing device 800 in the embodiment 4 is discussed in detail later.

Figure 19:
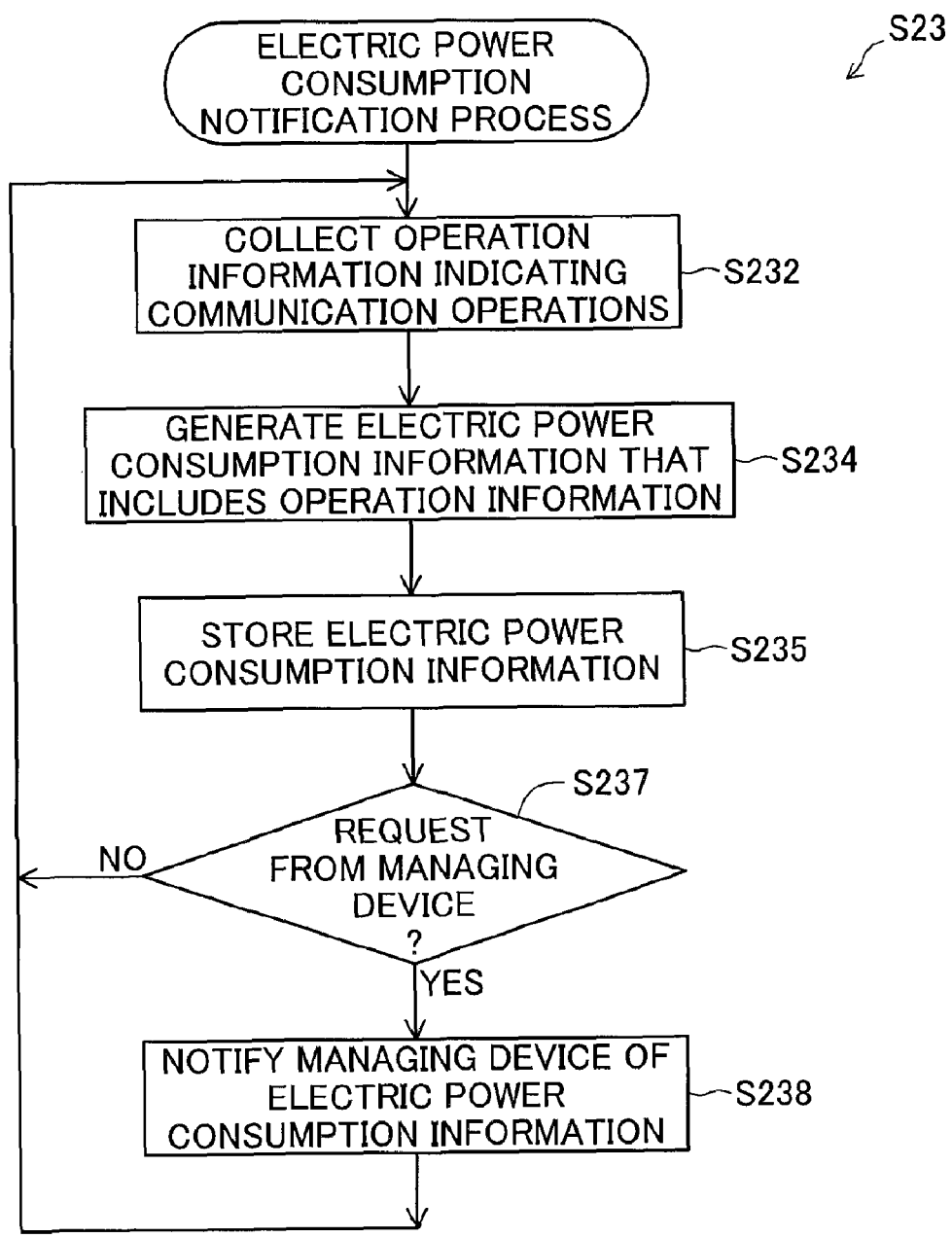
FIG. 19 is a flowchart showing a power consumption notification process executed by the switch in the embodiment 4.

D2. Operation of Computer Network:

FIG. 19 is a flowchart showing a power consumption notification process (Step S23) executed by the switch 200 in the embodiment 4. The power consumption notification process (Step S23) is a process for notifying the managing device 800 of power consumption information by the switch 200. In the present embodiment, the switch 200 initiates the power consumption notification process (Step S23) when powered on.

When the power consumption notification process (Step S23) is initiated, the operation information acquiring unit 292 of the switch 200 acquires, from the various parts of the switch 200, operation information showing a record of processing operations in the switch 200 (Step S232). In the present embodiment, the operation information acquired by the operation information acquiring unit 292 includes at least one of the items of operation information (a) to (i) mentioned previously.

Once the operating information is acquired (Step S232), the electric power information generating unit 270 of the switch 200 generates power consumption information which includes the operating information previously acquired by the operation information acquiring unit 292 (Step S234). The notification unit 280 of the switch 200 then stores the power consumption information generated by the electric power information generating unit 270 (Step S235).

If there is a request from the managing device 800 for power consumption information (Step S237: YES), the notification unit 280 of the switch 200, through the internal network 70, notifies the managing device 800 of the power consumption information generated by the electric power information generating unit 270 (Step S238).

If there is no request for power consumption information from the managing device 800 (Step S237: NO), or after the managing device 800 completes the notification of power consumption information (Step S238), the switch 200 repeats the process beginning from the step of collecting operating information (Step S232).

Figure 20:
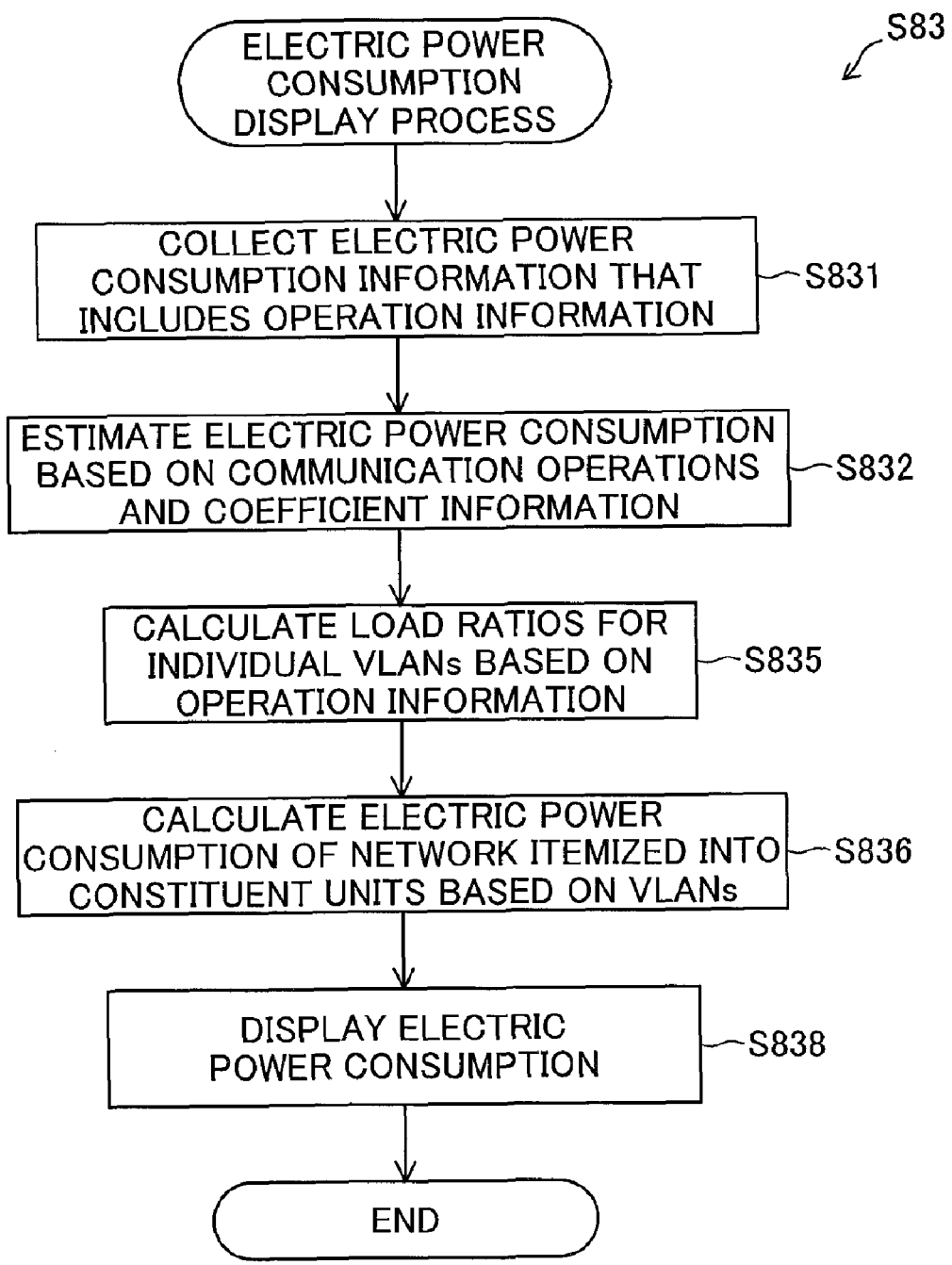
FIG. 20 is a flowchart showing a power consumption display process executed by the managing device in the embodiment 4.

FIG. 20 is a flowchart showing a power consumption display process (Step S83) executed by the managing device 800 in the embodiment 4. The power consumption display process (Step S83) is a process for producing a visual display of power consumption in the internal network 70 by the managing device 800. In the present embodiment, the managing device 800 executes the power consumption display process (Step S83) at periodic intervals.

When the power consumption display process (Step S83) is initiated, the collecting unit 810 of the managing device 800 collects, from the router 100 and from the switches 200 in the internal network 70, power consumption information which includes operation information showing records of communication operations took place in the router 100 and the switch 200 (Step S831).

The calculating unit 820 of the managing device 800 then estimates electric power consumption of the entire internal network 70, on the basis of the operating information included in the power consumption information collected by the collecting unit 810, and the coefficient information saved in the coefficient information storage unit 840 (Step S832). In the present embodiment, the calculating unit 820 first calculates power consumption of the router 100 and the switches 200 on the basis of the aforementioned relational expression (1), and then sums these power consumption values to calculate power consumption of the internal network 70 as a whole.

In accordance with calculation of power consumption by the entire internal network 70 (Step S832), on the basis of the operation information included in the power consumption information collected by the collecting unit 810, the calculating unit 820 of the managing device 800 calculates load ratios representing ratios of traffic volume on the individual VLANs in the entire internal network 70 (Step S835). In the embodiment 4, the calculating unit 820 calculates these load ratios in terms of traffic volume on individual VLANs with respect to total traffic volume on the entire internal network 70, based on information relating to VLAN input/output traffic included in the operation information.

After the power consumption and the load ratio for the entire internal network 70 are calculated (Steps S832 and S835), the calculating unit 820 of the managing device 800 proportionally shares the power consumption of the entire internal network 70 according to the load ratios for the individual VLANs in the internal network 70, in order to calculate power consumption of the internal network 70 itemized into individual VLANs configured in the internal network 70 (Step S836).

After the power consumption is calculated (Step S836), the display unit 830 of the managing device 800 displays the power consumption information calculated by the calculating unit 820 (Step S838).

D3. Effects

According to the internal network 70 in the embodiment 4 described above, the power consumption of the internal network 70 can be displayed itemized into constituent units based on virtual networks (VLAN) configured in the internal network 70. As a result, measures intended to limit power consumption from a VLAN configuration standpoint can be taken according to actual conditions of power consumption of the internal network 70.

Furthermore, in the internal network 70, because power consumption information which includes operation information is collected by the managing device 800 from the router 100 and the switch 200, and the power consumption of the internal network 70 is calculated on the basis of the operation information collected by the managing device 800, the load on the router 100 and on the switch 200 can be reduced.

E. Alternative Embodiments

While certain preferred embodiments of the invention have been shown above, the embodiments herein should not be construed as limiting the invention, and the invention may be worked in various other modes without departing from the spirit thereof.

For example, in the preceding embodiments, the router 100 and the switch 200 notify the managing device 800 of the power consumption information in response to the request from the managing device 800, but in an alternative embodiment, the router 100 and the switch 200 may instead notify the managing device 800 of power consumption information on a periodic basis. The load on the managing device 800 can be reduced thereby.

Also, while the preceding embodiments described examples of handling power consumption in the internal network 70, in an alternative embodiment, the present invention may be adapted to handle power consumption in the computer network 10, the carrier network 20, the backbone network 30, the access networks 40, the user networks 60, VPNs, and other such computer networks. This would allow power consumption in these other computer networks to be displayed itemized into constituent units based on the configuration of the computer network.

Further, while the preceding embodiments described examples in which power consumption is handled using itemization for constituent units based on hardware configuration or VLAN configuration in a computer network, in an alternative embodiment, power consumption may instead be handled using itemization for constituent units based on application flows which occurs on a computer network.

Moreover, while the preceding embodiments described examples in which notification of power consumption information is provided by the router 100 and the switch 200, in an alternative embodiment, notification of power consumption information may instead be provided by other network devices, such as the client computers 610 or the server computer 620.

While the preceding embodiments described examples in which power consumption by individual VLANs is calculated through proportional allocation according to load ratios on individual VLANs, in an alternative embodiment, power consumption by individual VLANs may be estimated based on coefficient information and operation information for individual VLANs.

What is claimed is:

1. A network system that forms a computer network, comprising:
   a collecting unit that collects power consumption information from a connecting device, wherein the power consumption information shows power consumption of the connecting device, and the connecting device interconnects a plurality of communication paths in the computer network;
   a calculating unit that calculates power consumption of the computer network based on the collected power consumption information, wherein the calculated power consumption is itemized into constituent units based on a configuration of the computer network; and
   a display unit that displays the calculated power consumption;
   wherein the calculating unit includes a first calculating unit that calculates power consumption of the computer network based on the collected power consumption information, wherein the power consumption calculated by the first calculating unit is itemized into constituent units based on a virtual network which is configured virtually on the computer network.

2. The network system according to claim 1, wherein the calculating unit includes a second calculating unit that calculates power consumption of the computer network based on the collected power consumption information, wherein the power consumption calculated by the second calculating unit is itemized into constituent units based on a hardware configuration of the computer network.

3. The network system according to claim 2,
wherein the connecting device includes:
- an electronic component that executes at least one of functions of the connecting device;
- a module board into which the electronic component is integrated;
- a functional unit into which the module board is integrated,
wherein the power consumption calculated by the second calculating unit is itemized into constituent units based on at least one of:
- the electronic component in the connecting device;
- the module board in the connecting device;
- the functional unit in the connecting device;
- the entire connecting device;
- a storage rack in which the connecting device is housed;
- a power supply system that supplies electric power to the connecting device;
- a network point in which the connecting device is installed; and
- the entire computer network.

4. The network system according to claim 1, wherein the virtual network includes a virtual local area network and/or a virtual private network.

5. The network system according to claim 1, wherein the calculating unit includes a third calculating unit that calculates power consumption of the computer network based on the collected power consumption information, wherein the power consumption calculated by the third calculating unit is itemized into constituent units based on an application flow which occurs on the computer network.

6. The network system according to claim 1, wherein the collecting unit includes a first collecting unit that collects, as the power consumption information, actual measured information from a connecting device, and the actual measured information shows power consumption values which are actually measured in various parts of the connecting device.

7. The network system according to claim 1, wherein the collecting unit includes a second collecting unit that collects, as the power consumption information, operation information from a connecting device, and the operation information shows operations which are executed by various parts of the connecting device.

8. The network system according to claim 1, wherein the display unit displays the calculated power consumption in a managing device, and the managing device manages the computer network.

9. A connecting apparatus that interconnects a plurality of communication paths in a computer network, comprising:
- a power information generating unit that generates power consumption information, wherein the generated power consumption information shows power consumption of the connecting apparatus and is itemized into constituent units based on a virtual network which is configured virtually on the computer network; and
- a notification unit that notifies a managing device of the generated power consumption information, wherein the managing device manages the computer network.

10. The connecting apparatus according to claim 9, further comprising:
- an electronic component that executes at least one of functions of the connecting apparatus;
- a module board into which the electronic component is integrated;
- a functional unit into which the module board is integrated,
wherein the power information generating unit further generates power consumption information itemized into constituent units based on at least one of: the electronic component; the module board; and the functional unit.

11. The connecting apparatus according to claim 9, wherein the power information generating unit includes a first generating unit that generates power consumption information based on power consumption values which are actually measured in various parts of the connecting apparatus.

12. The connecting apparatus according to claim 9, wherein the power information generating unit includes a second generating unit that generates power consumption information based on operation information of operations which are executed by various parts of the connecting apparatus.

13. A managing apparatus that manages a computer network, comprising:
- a collecting unit that collects power consumption information from a connecting device, wherein the power consumption information shows power consumption of the connecting device, and the connecting device interconnects a plurality of communication paths in the computer network;
- a calculating unit that calculates power consumption of the computer network based on the collected power consumption information, wherein the calculated power consumption is itemized into constituent units based on a configuration of the computer network; and
- a display unit that displays the calculated power consumption;
- wherein the calculating unit includes a first calculating unit that calculates power consumption of the computer network based on the collected power consumption information, wherein the power consumption calculated by the first calculating unit is itemized into constituent units based on a virtual network which is configured virtually on the computer network.

14. The managing apparatus according to claim 13, wherein the calculating unit includes a second calculating unit that calculates power consumption of the computer network based on the collected power consumption information, wherein the power consumption calculated by the second calculating unit is itemized into constituent units based on a hardware configuration of the computer network.

15. The managing apparatus according to claim 13, wherein the calculating unit includes a third calculating unit that calculates power consumption of the computer network based on the collected power consumption information, wherein the power consumption calculated by the third calculating unit is itemized into constituent units based on an application flow which occurs on the computer network.

16. A method for managing a computer network, comprising:
- collecting power consumption information from a connecting device, wherein the power consumption information shows power consumption of the connecting device, and the connecting device interconnects a plurality of communication paths in the computer network;
- calculating power consumption of the computer network based on the collected power consumption information, wherein the calculated power consumption is itemized into constituent units based on a virtual network which is configured virtually on the computer network; and
- displaying the calculated power consumption.

17. The method according to claim 16, further comprising calculating power consumption information itemized into constituent units based on an application flow which occurs on the computer network.

18. The network system according to claim 1, further comprising a traffic counting unit that counts traffic of each virtual network,
   wherein the first calculating unit proportionally shares the power consumption based on the power consumption information collected by the collecting unit in accordance with ratios of the traffic of the each virtual network counted by traffic counting unit, to calculate the power consumption itemized into the constituent units based on the virtual network.

19. The connecting apparatus according to claim 9, further comprising a traffic counting unit that counts traffic of each virtual network,
   wherein the power information generating unit proportionally shares the power consumption of the connecting apparatus in accordance with ratios of the traffic of the each virtual network counted by traffic counting unit, to calculate the power consumption itemized into the constituent units based on the virtual network.

20. The managing apparatus according to claim 13, further comprising a traffic counting unit that counts traffic of each virtual network,
   wherein the first calculating unit proportionally shares the power consumption based on the power consumption information collected by the collecting unit in accordance with ratios of the traffic of the each virtual network counted by traffic counting unit, to calculate the power consumption itemized into the constituent units based on the virtual network.

21. The method according to claim 16, further comprising counting traffic of each virtual network,
   wherein the calculating includes proportionally sharing the power consumption based on the power consumption information collected by the collecting in accordance with ratios of the traffic of the each virtual network counted by counting, to calculate the power consumption itemized into the constituent units based on the virtual network.

* * * * *